United States Patent
Apostolopoulos et al.

(10) Patent No.: US 8,045,584 B2
(45) Date of Patent: Oct. 25, 2011

(54) METHOD AND SYSTEM FOR UTILIZING A TAG TO OPTIMIZE PORTION OF DATA TRANSFER

(75) Inventors: John G. Apostolopoulos, Palo Alto, CA (US); Susie J. Wee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1056 days.

(21) Appl. No.: 11/412,371

(22) Filed: Apr. 26, 2006

(65) Prior Publication Data

US 2007/0091927 A1    Apr. 26, 2007

Related U.S. Application Data

(63) Continuation of application No. 11/255,742, filed on Oct. 21, 2005.

(51) Int. Cl.
*H04J 3/24* (2006.01)
(52) U.S. Cl. ....................................................... 370/473
(58) Field of Classification Search .................. 370/389, 370/392, 471, 473, 474, 289, 412, 432; 704/7
See application file for complete search history.

(56) References Cited

U.S. PATENT DOCUMENTS

| | | | | |
|---|---|---|---|---|
| 4,408,323 | A * | 10/1983 | Montgomery | 370/389 |
| 5,204,958 | A * | 4/1993 | Cheng et al. | 707/102 |
| 5,440,545 | A * | 8/1995 | Buchholz et al. | 370/426 |
| 6,222,841 | B1 | 4/2001 | Taniguchi | |
| 6,483,543 | B1 | 11/2002 | Zhang et al. | |
| 6,738,617 | B2 * | 5/2004 | Rosen et al. | 455/418 |
| 6,771,703 | B1 | 8/2004 | Oguz et al. | |
| 6,922,845 | B2 | 7/2005 | Yap et al. | |
| 6,944,762 | B1 | 9/2005 | Garrison | |
| 6,963,972 | B1 | 11/2005 | Chang et al. | |
| 7,065,213 | B2 * | 6/2006 | Pinder | 380/240 |
| 7,499,546 | B2 | 3/2009 | Donescu et al. | |
| 2002/0047899 | A1 | 4/2002 | Son et al. | |
| 2002/0163911 | A1 | 11/2002 | Wee et al. | |
| 2003/0068040 | A1 * | 4/2003 | Wee et al. | 380/200 |
| 2003/0189900 | A1 | 10/2003 | Barany et al. | |
| 2004/0010613 | A1 | 1/2004 | Apostolopoulos et al. | |
| 2004/0010614 | A1 | 1/2004 | Mukherjee et al. | |
| 2005/0193138 | A1 | 9/2005 | Kim | |

(Continued)

OTHER PUBLICATIONS

Jacob Chakareski't, John Apostolopoulost, Susie Weet. Wai-tian Tant and Bemd Girod, R-D Hint Tracks for Low-Complexity R-D Optimizing Video Streaming, Jun. 2004 IEEE, pp. 1387 to 1390.*

(Continued)

*Primary Examiner* — Derrick Ferris
*Assistant Examiner* — Mang Yeung

(57) ABSTRACT

A method for utilizing a tag to optimize portion of data transfer is disclosed. In one embodiment, a storage location is provided on a single node for storing at least one portion of data received from at least one data stream. The header containing information about the portion of data coupled with the portion of data is accessed. A database entry is generated at the node based on the information contained on the header. A tag pointing to the database entry is also generated. The tag pointing to the database entry is then correlated with the portion of data. In so doing, when the portion of data is processed, the processing is based on the context information of the database pointed to by the tag without requiring access to the header or other data within the portion of data.

20 Claims, 17 Drawing Sheets

U.S. PATENT DOCUMENTS

2006/0227811 A1* 10/2006 Hussain et al. ............... 370/503
2007/0036447 A1 2/2007 Dei et al.

OTHER PUBLICATIONS

Susie Wee and John Apostolopoulos, Secure Scalable Streaming and Secure Transcoding With JPEG-2000, IEEE (2003), pp. 205 to 208.*
Susie J. Wee and John G. Apostolopoulos, Secure Scalable Streaming Enabling Transcoding Without Decryption, IEEE (2001), pp. 437 to 440.*
Susie Wee and John Apostolopoulos, Secure Scalable Video Streaming for Wireless Networks, IEEE (May 2001).*
Brian A. Heng\, John G. Apostolopoulos, and Jae S. Lim, End-To-End Rate-Distortion Optimized Mode Selection, IEEE (Mar. 2005).*
John C. Apostolopoulo, Secure Media Streaming & Secure Adaptation for Non-Scalable Video, (IEEE 2004), pp. 1763 to 1766.*
Murasaki, Masashi et al~"A Video Contents Delivery Method Using Scalable Video Data Over the Network"~Internet Citation~Apr. 29, 2003~pp. 1-6.

* cited by examiner

METHOD AND SYSTEM FOR UTILIZING A TAG TO OPTIMIZE PORTION OF DATA TRANSFER

CROSS REFERENCES TO RELATED APPLICATIONS

This Application is a continuation of the co-pending, commonly-owned U.S. patent application, Ser. No. 11/255,742, filed Oct. 21, 2005, by J. Apostolopoulos et al., entitled "Method For Optimizing Portions of Data From Plurality of Data Streams at a Transcoding Code," and hereby incorporated by reference in its entirety.

TECHNICAL FIELD

Embodiments of the present invention relate to the field of streaming media data.

BACKGROUND ART

Media streaming and communications continue to gain in importance. Adapting the media to accommodate diverse client capabilities and heterogeneous and time-varying communication links is one of the keys to efficient and effective media streaming. For example, clients can have different display, communication, power and computational capabilities. In addition, different portions of a network (in particular, wired portions of the network versus wireless portions of the network) can have different maximum bandwidths and quality levels, and network conditions can change over time. To accommodate the diversity in client and network characteristics as well as the time-varying nature of network conditions, intermediate network ("mid-network") nodes or proxies that adapt or transcode the media stream to the client and the network can be situated on the communication path between a source of media content and the client.

Maintaining the security of the media content is another key to successful media streaming. Typically, the media content is encrypted to protect the content against unauthorized access en route. Ideally, the content would remain encrypted between the source and its final destination (e.g., the client). However, preserving end-to-end security presents a challenge to mid-network transcoding, because transcoding an encrypted stream means decrypting the stream, transcoding the decrypted stream, and re-encrypting the result. Thus, each network transcoding node presents a potential security breach.

There are other challenges to streaming media over a network. For example, some data packets transmitted over a network can experience delays along the way, perhaps arriving late at their destination. Also, some data packets may be lost along the way. The effects of late or lost data packets may be exacerbated for video data that are predicatively encoded (compressed). Predictive encoding introduces dependencies in the encoded data that improve the amount of compression but can also result in error propagation in the event of data packet loss or late arrival. With predictive encoding, the decoding of a frame of data may rely on the information in another frame. For example, with MPEG (Moving Pictures Experts Group) encoding, a B-frame is predicted from two P-frames or an I-frame and P-frame. Therefore, data packets for the two P-frames or for the P-frame and the I-frame need to be received earlier than their respective display times so that those frames can be used to decode the B-frame. Thus, encoded video frames that do not arrive or that arrive late at the decoder (e.g., a client or destination node) may not only miss their respective display deadlines, but may also prevent a number of other, subsequent frames from being displayed properly, depending on the particular coding dependencies of the late or missing frames. This can affect the overall quality of the display.

Thus, in addition to accommodating diverse client capabilities and heterogeneous and time-varying communication links and in addition to maintaining security of the media content, another key to successful media streaming over a network is reducing the likelihood that packets may be lost or delayed. Conventional solutions are either lacking in one or more of these capabilities, or are unduly complex.

DISCLOSURE OF THE INVENTION

Embodiments of the present invention pertain to methods and systems thereof for utilizing a tag to optimize portion of data transfer is disclosed. In one embodiment, a storage location is provided on a single node for storing at least one portion of data received from at least one data stream. The header containing information about the portion of data coupled with the portion of data is accessed. A database entry is generated at the node based on the information contained on the header. A tag pointing to the database entry is also generated. The tag pointing to the database entry is then correlated with the portion of data. In so doing, when the portion of data is processed, the transcoding is based on the context information of the database pointed to by the tag without requiring access to the header or other data within the portion of data. Processing can be effectively performed across one data stream, across a subset of all of the data streams, or across all of the plurality of data streams at the transcoding node. This processing can be performed at the sender, at a mid-network node, or at the receiver.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
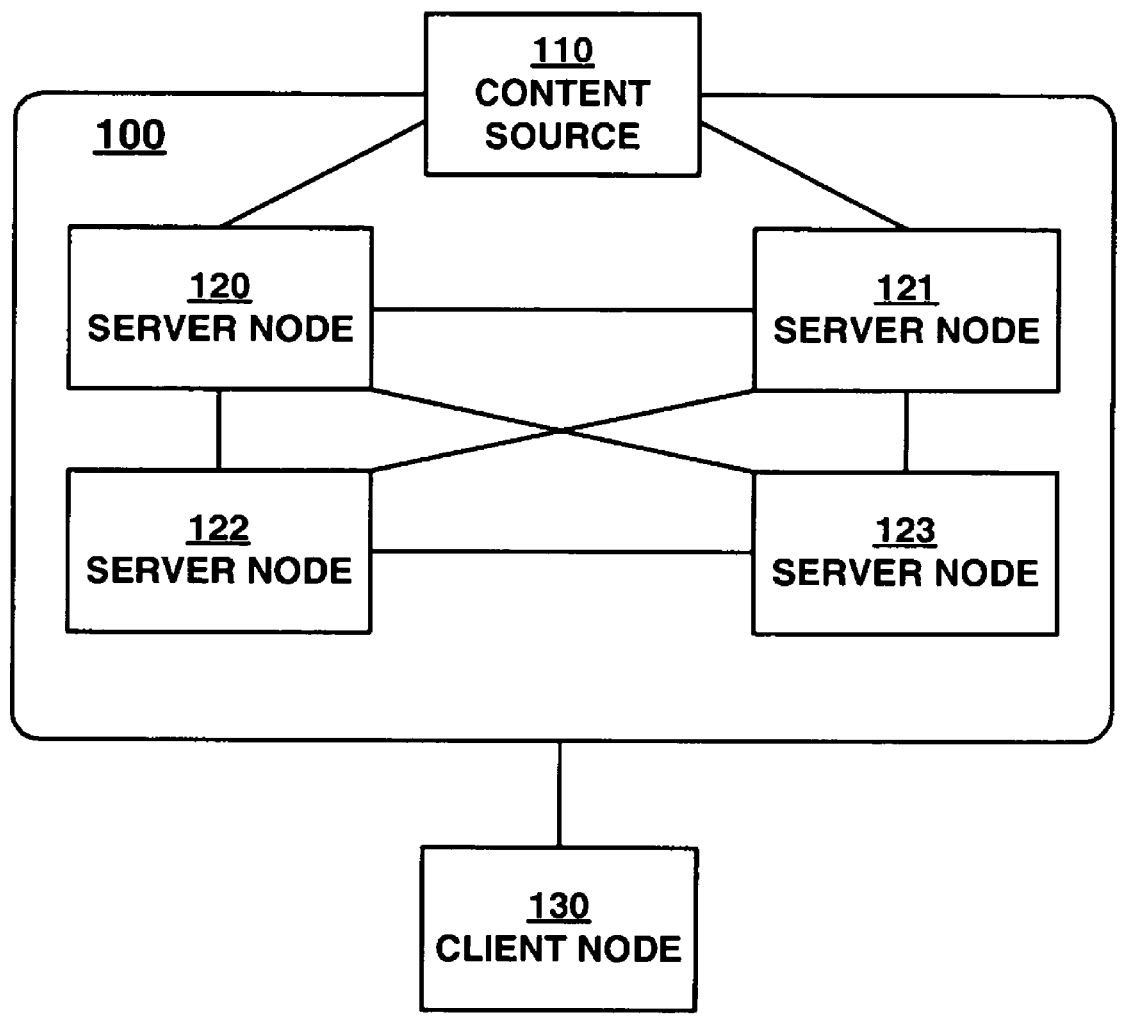
FIG. 1 is a block diagram of a network upon which embodiments in accordance with the present invention may be implemented.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

The descriptions and examples provided herein are discussed in the context of multimedia data (also referred to herein as media data or media content). One example of multimedia data is video data accompanied by audio data; for example, a movie with soundtrack. However, media data can be video only, audio only, or both video and audio. In general, the present invention, in its various embodiments, is well-suited for use with speech-based data, audio-based data, image-based data, Web page-based data, graphic data and the like, and combinations thereof.

Secure Scalable Streaming and Secure Transcoding

With secure scalable streaming, media data is encoded and encrypted in a manner that allows downstream transcoders to perform transcoding operations by discarding parts of the encrypted and encoded content, without decrypting (and also without decoding) the content.

Secure scalable streaming is based on careful coordination of encoding, encrypting and packetizing operations. As used herein, scalable encoding is defined as a process that takes original data as input and creates scalably encoded data as output, where the scalably encoded data has the property that portions of it can be used to reconstruct the original data with various quality levels. Specifically, the scalably encoded data can be thought of as an embedded bitstream. A portion of the bitstream can be used to decode a baseline-quality reconstruction of the original data, without requiring any information from the remainder of the bitstream, and progressively larger portions of the bitstream can be used to decode improved reconstructions of the original data. For example, if an image is scalably encoded by resolution, then a small portion of the data can be used to decode a low-resolution image, a larger portion of the data can be used to decode a medium-resolution image, and all of the data can be used to decode a full-resolution image. Scalable coding standards include, but are not limited to, MPEG-1/2/4 and H.261/2/3/4, JPEG (Joint Photographic Experts Group) 2000 including Motion JPEG 2000, and 3-D subband coding.

As used herein, progressive encryption is defined as a process that takes original data (plaintext) as input and creates progressively encrypted data (ciphertext) as output. Progressive encryption techniques include, for example, cipher block chains and stream ciphers. These progressive encryption methods have the property that the first portion of the data is encrypted independently, and later portions are encrypted based on earlier portions. The plaintext is encrypted in a beginning-to-end or sequential manner, wherein a first portion of the bitstream is encrypted by itself, a second portion of the bitstream is encrypted using (e.g., in combination with) the first portion (either the encrypted or the unencrypted first portion may be used), and so on. Progressively encrypted data has the property that the first portion can be decrypted alone, without requiring information from the remainder of the original data; and progressively larger portions can be decrypted with this same property, in which decryption can use data from earlier but not later portions of the bitstream. When properly matched with scalable coding and packetization, progressive encryption provides the ability to transcode media data by truncating or discarding data packets without decrypting the media data. Progressive encryption standards include, but are not limited to, the Data Encryption Standard (DES), Triple-DES, and the Advanced Encryption Standard (AES). These encryption primitives can be applied using a number of block-cipher modes including electronic codebook (ECB), cipher block chaining (CBC), cipher-feedback (CFB), output feedback (OFB), and counter (CTR) modes.

Along with progressive encryption, authentication techniques that may be used include, but are not limited to, popular authentication techniques such as message authentication codes (MACs) and digital signatures (DSs). Popular MACs include hash-based MACs such as Hashed Message Authentication Code (HMAC) using the Secure Hash Algorithm-1 (SHA-1) hash, or cipher-based MACs such as AES in CBC mode. Data packets can be independently authenticated so that one or more packets can be discarded without affecting the ability to authenticate other packets. Alternatively, groups of packets can be independently authenticated, so that groups of packets can be discarded without affecting the ability to authenticate other groups of packets. The above cryptographic techniques may be applied using symmetric key techniques or using public/private key techniques.

To achieve effective and efficient secure scalable streaming, the scalably encoded and progressively encrypted data is placed deliberately into data packets in a prioritized manner so that transcoding can be performed by truncating or discarding the packets, without decrypting the data. In one embodiment, the content is encoded into data packets that are progressively encrypted. Associated with each packet is a header that may or may not be encrypted. The header can be encrypted using an encryption technique that is different from that used to encrypt the content data. If the header is encrypted, it can be decrypted without decrypting the data that represents the media content. The header of a packet includes information that identifies, for example, truncation points in the packet. A first truncation point may correspond to, for example, a first bitrate, resolution or quality level, a second truncation point may correspond to a second bitrate, resolution or quality level, and so on. To transcode or adapt the content to achieve the first level, for example, the header information is read and the first truncation point is identified. The packet can then be truncated at the first truncation point, so that data not needed to realize the first resolution or quality or bitrate level is discarded. The truncated packet is then forwarded to its next destination.

Although bitrate, resolution and quality are named in the example above, embodiments in accordance with the present invention are not so limited. The example, and other examples herein, are not intended to limit the breadth and scope of the invention, but rather to illustrate the variety of parameters that exist and that can be used as a basis for transcoding.

It is possible to transcode even when only a portion of the data is available. That is, for example, one portion of the entirety of data associated with a particular instance of content can be transcoded while another portion of that entirety of data is being received or accessed.

As used herein, truncation of a data packet refers generally to the removal of data from some part of the data packet. In one embodiment, the data is arranged in the packet so that data for a first resolution level, for example, is located in a first portion of the packet, data for a second resolution level is located in a second portion of the packet, and data for a third resolution is located in a third portion, where the second portion is located between the first and third portions. The header information identifies the points in the packet that demarcate the first, second and third portions. In this embodiment, if an image is to be reconstructed at, for example, only the first resolution level, then during transcoding the second and third portions can be truncated. That is, the data packet is in essence severed at the first truncation point, removing the second and third portions, leaving a smaller packet consisting of only the first portion (and the header).

In one embodiment, truncation points for a data packet are specified according to an analysis such as a rate-distortion (R-D) analysis, so that the stream of data packets can be compressed to a rate that is R-D optimal or nearly R-D optimal. In another embodiment, the header portions of the data packets contain information that describes the R-D curves generated by the R-D analysis, and the truncation points are derived from further analysis of the R-D curves.

R-D coding can be achieved by generating an R-D plot for each region of a video image, and then operating on all regions at the same slope that generates the desired total bitrate. Nearly optimal transcoding can be achieved at the data packet level by placing the optimal R-D cutoff points for a number of quality levels in the header portions of the data packets. Then, a transcoder can truncate each packet at the appropriate cutoff point; thus, the resulting packets will contain the appropriate number of bits for each region of the image for the desired quality level. The transcoder reads each packet header, and then truncates the packet at the appropriate point. For example, if three (3) regions in an image are encoded into separate packets, then 3 R-D optimal truncation points are identified for each region and their locations placed in the respective packet header. The transcoder can choose to operate at any of the 3 R-D points (or points in between), and then can truncate each packet at the appropriate cutoff point.

In another embodiment, the data is arranged in a data packet so that data for a first resolution level, for example, is placed in multiple portions of the packet, data for a second resolution level is located in other multiple portions of the packet, and data for a third resolution is located in yet other multiple portions of the packet. That is, data segments associated with the first resolution level, data segments associated with the second resolution level, and data segments associated with the third resolution level are interleaved in the packet. In this example, the header information identifies where the data segments that correspond to each resolution level are located in the packet. In this embodiment, if an image is to be reconstructed at, for example, only the first resolution level, then during transcoding the data segments associated with the first resolution level can be extracted from the packet and re-packetized. Alternatively, the data segments associated with the second and third resolution levels can be extracted from the packet and discarded. R-D coding can be achieved by generating an R-D curve for each segment at the same operating point that generates, for example, a desired bitrate. The R-D information is derived from the compressed but unencrypted data, and then included with the encrypted bitstream as "hints" that can be used to transcode the encrypted data without decrypting the data. The hints may or may not be encrypted. Using the R-D information provided by the hints, the data segments that have a lesser impact on the quality of the reconstructed image can be identified. During transcoding, the data segments corresponding to the frames of lesser importance can be dropped or extracted, as described above. Significantly, the transcoding operation is performed without decrypting the media data.

A premise of the discussion in the preceding paragraph is that the segment lengths do not matter—that is, there is not a constraint on bitrate so that, for example, some number of segments can be sent irrespective of their lengths—or the segments are of equal length. If there is a bitrate constraint, then segment lengths may be a factor to consider during transcoding—for example, it may be better to send two shorter segments instead of one longer one, or vice versa. Thus, in one embodiment, segments are ranked according to their relative "utility" (e.g., their importance per bit). In one embodiment, the utility of a segment is measured by the distortion per bit in the segment. That is, the amount of distortion associated with a segment (the amount of distortion that would result if the segment was dropped or discarded) is divided by the number of bits in the segment, and the ratio of distortion per bit provides the utility of the segment. Segments that have relatively higher utilities are forwarded, while segments that have relatively lower utilities can be dropped or discarded if necessary or desirable.

Instead of truncating packets, transcoding can be accomplished by discarding or dropping entire packets. Again, associated with each packet is a header that may or may not be encrypted. If the header is encrypted, it can be decrypted without decrypting the data that represents the media content. A first packet may contain data that, when decoded, is associated with, for example, a first bitrate, resolution or quality level, and a second packet may contain data that, when decoded and combined with the data in the first packet, is associated with a second bitrate, resolution or quality level. The header can include information that identifies which packets are associated with which of the levels. To transcode or adapt the content to achieve the first level, for example, the header information of each packet is read, the first packet is identified as being associated with the first level, and the second packet is identified as being associated with the second level. Accordingly, the first packet is forwarded to its next destination, and the second packet is dropped or discarded.

The header portion may also contain information identifying each data packet by number, for example. Accordingly, a transcoder can eliminate certain data packets from the stream; for example, if every other packet is to be eliminated (e.g., the odd-numbered packets), a transcoder can use the header information to identify the odd-numbered data packets and eliminate those from the stream of data packets.

To summarize, transcoding can include: 1) packet truncation by truncating one or both ends of a packet; 2) packet truncation by discarding a portion or portions of the packet other than an end; and 3) discarding a packet in entirety. Secure scalable streaming allows streaming media systems to achieve the seemingly conflicting properties of mid-network transcoding and end-to-end security. Transcoding of encrypted data can be performed at intermediate, potentially untrusted, network nodes by truncating or discarding packets without decrypting the data. By design, the transcoding device does not require knowledge of the compression technique, the encryption technique, or even the type of media being transcoded.

Secure Transcoding for Non-scalable Data

The discussion above focused on media encoders that are intended to provide scalability. However, embodiments in accordance with the present invention are also applicable to non-scalable encoders. This can be accomplished because media encoders produce compressed bits, but some of the bits will be more important than other bits considering their impact on the quality of the reconstructed (decoded) image. By recognizing the relative importance of some bits versus other bits, and by extension the relative importance of some video frames versus other frames, bits or frames of greater importance can be identified, so that during transcoding the bits or frames of lesser importance can be dropped or discarded.

To illustrate, consider an example in which encoded video data consists only of P-frames after an initial I-frame (e.g., there are no B-frames). Because the encoded video includes only P-frames, a natural prioritization of frames is not suggested. However, by prioritizing the P-frames according to their respective effect on the reconstructed image, if during transcoding it is necessary to eliminate one or more P-frames, then packets associated with lower priority P-frames can be dropped or discarded, while packets associated with higher priority P-frames can be forwarded to their destination.

In one embodiment, R-D information for performing R-D optimized streaming is generated for the video data. The R-D attributes are summarized in a "hint track" associated with the stream of video data. While the video data is encrypted for security, the hint track may not be encrypted. The R-D information in the hint track can be used to transcode the data. Continuing with the example above, instead of treating all of the P-frames identically, certain P-frames can be intelligently selected based on the R-D information in the hint track. That is, those P-frames that have a lesser impact on the quality of the reconstructed image can be identified. It may even be possible to rank the P-frames according to their impact on image quality. During transcoding, the packets corresponding to the P-frames of lesser importance can be dropped. The number of packets/frames that are dropped can depend, for example, on network constraints. Significantly, the transcoding operation is performed without decrypting the media data.

In another embodiment, information about the relative importance of each frame, and correspondingly about the relative importance of each packet, can be included in header information associated with each packet. Data in the data packet is encrypted, while the header information may or may not be encrypted. In a manner similar to that just described, network transcoders can select or discard packets based on their relative importance and on network constraints, without decrypting the media data.

Other Processing of Data

The discussion above pertains to the transcoding of data. Other types of processing can be performed as well. For example, processing can also be used to add redundancy through repetition coding or error correction coding. Adding redundancy may be appropriate, for example, if a network has lossy characteristics, so that it is useful to send some data more robustly to overcome losses in the network, as well as a loss of a network node (e.g., in a peer-to-peer network, a network node may be turned off).

With repetition coding, the same data is sent multiple times to increase the probability that the data will reach its destination. With error correction coding (e.g., forward error correction), specialized inter-packet redundancy (e.g., Reed-Solomon block codes) are added to the data to overcome losses. Error correction approaches may also interleave packets to convert burst errors into isolated errors. In one implementation, for example, each of the data portions A, B and C and a checksum version of the data portions A, B and C are transmitted. Accordingly, even if one of these transmitted components is not received, the components that are received are sufficient for reproducing the data portions A, B and C.

In general, as used herein, "processing" can refer to (but is not limited to): transcoding; adding redundancy; signal enhancement (for images, video, audio, graphics, data, and header data); noise reduction; resolution enhancement; logo insertion; splicing of streams; VCR functionalities (e.g., speedup, slowdown, pausing of streams); merging video and audio streams; ad insertion; personalization of streams; removing objects from streams; foreground/background segmentation of streams; object recognition; face recognition; voice recognition; speech recognition; similarity detection; signal analysis (e.g., image, video, and audio analysis); text analysis; and media search operations.

Processing Using Information About the Data and the Network

The discussion below describes the processing of data according to various embodiments in accordance with the present invention. In these various embodiments, the data may be scalable or non-scalable, scalably encoded or not, encrypted or not encrypted, and combinations thereof, as described above. Transcoding can be performed by selecting or discarding packets, or by truncating packets, as described above.

FIG. 1 is a representation of a network 100 upon which embodiments of the present invention may be implemented. In the present embodiment, network 100 includes a content source 110 coupled to a number of interconnected server nodes 120, 121, 122 and 123. There may of course be a greater or lesser number of content sources and server nodes than those illustrated.

The interconnections between these nodes, including content source 110, may be a wired connection, a wireless connection, or a combination thereof. Each interconnection includes one or more channels, so that multiple streaming sessions between nodes can take place in parallel.

Generally speaking, content source 110 and server nodes 120-123 are types of devices that provide the capability to process and/or store data, and to send and receive such data. In particular, in one embodiment, server nodes 120-123 carry out processing operations. In such an embodiment, content source 110 may be a storage device, and server nodes 120-123 may be computer systems as well as other types of devices that may not be typically considered computer systems but have similar capabilities. In another embodiment, content source 110 and server nodes 120-123 carry out processing operations, and as such may be computer systems as well as other types of devices.

In communication with network 100 are client devices such as client node 130, which may be a mobile device or a stationary device. In one embodiment, network 100 is for streaming media data to client node 130. There may of course be multiple client nodes. The client node 130 may be coupled to the network 100 via a wired connection, a wireless connection, or a combination thereof.

In general, network 100 provides the capability to provide data from content source 110, and/or from any of the intermediate server nodes 120-123, to the client node 130. The route, or path, taken by the data as it travels from the content source 110 to the client node 130 may pass through any number of intervening nodes and interconnections between those nodes. Generally speaking, embodiments of the present invention pertain to the streaming of data packets from a sender to a receiver. Any of the nodes in network 100 may be considered to be a sender, and similarly any of the nodes in network 100 may be considered to be a receiver. The sender and receiver nodes may be adjacent nodes, or they may be separated by intervening nodes. Furthermore, in some embodiments, any of the nodes in network 100, including the content source and the client node, can perform the processing of media streams described in conjunction with the figures below. Also, although client node 130 is illustrated as an end node in the network 100, the client node 130 may be a node within the network.

Figure 2:
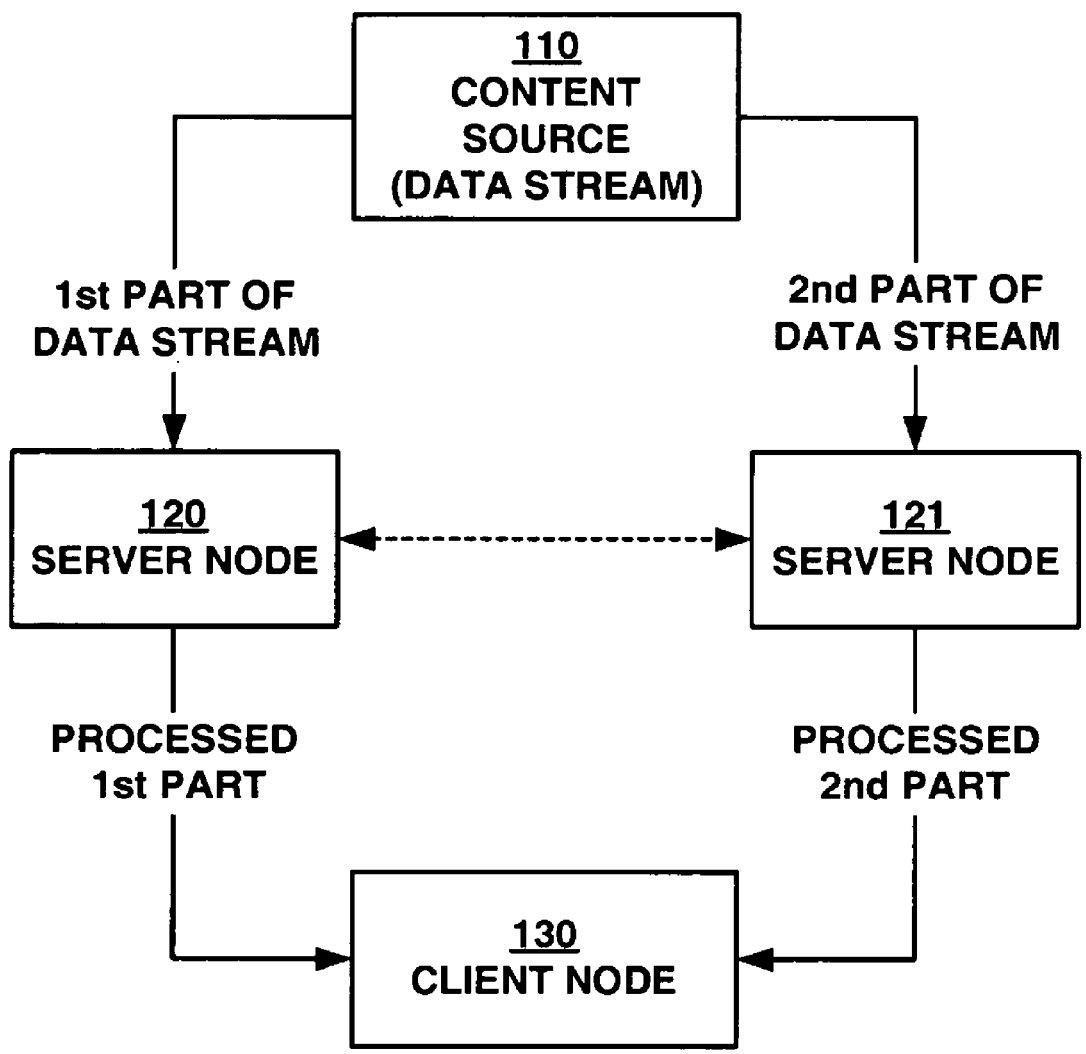
FIG. 2 is a block diagram of parallel nodes in a network upon which embodiments in accordance with the present invention may be implemented.

FIG. 2 is a block diagram showing example parallel server nodes 120 and 121 of network 100 (FIG. 1), upon which embodiments in accordance with the present invention may be implemented. In general, server nodes 120 and 121 are network nodes that can perform processing of media streams in parallel. More specifically, server nodes 120 and 121 can independently process different portions of a single stream. That is, in the present embodiment, a first portion of a stream is received at node 120 for processing, and a second portion of the same stream is received at node 121 for processing. In one such embodiment, the data (or data packets) in the first portion and the data (or data packets) in the second portion are mutually exclusive—that is, the data in the first portion is not duplicated in the second portion and vice versa. In other embodiments, the data in the first portion and the data in the second portion overlap each other in part or in entirety.

Although two parallel nodes are described, there may be more than two parallel nodes. Also, although a single stream (separated into two portions) is described, there may be many streams, some or all of which are similarly separated into portions and processed in parallel by server nodes 120 and 121. That is, each of the server nodes 120 and 121 can operate on more than one stream at a time. In essence, server nodes 120 and 121, operating on two parts of the same stream, represent a fundamental case of parallel nodes, which can be extended to situations involving more than two parallel server nodes and more than a single stream per node. Furthermore, there may be one or more intervening nodes situated on the paths from the content source 110 to the server nodes 120 and 121, and there may also be one or more intervening nodes situated on the paths from the server nodes 120 and 121 to the client node 130. Thus, server nodes 120 and 121 may receive streams from an upstream node that is not the content source, and may send streams to a downstream node that is not the client node. Also, server nodes 120 and 121 may receive parts of the same stream from the same upstream node or from different upstream nodes, and may deliver processed streams to the same downstream node or to different downstream nodes.

According to embodiments of the present invention, each of the server nodes 120 and 121 makes processing decisions based at least in part on downstream and/or upstream network conditions respectively measured and observed by the server nodes 120 and 121.

A processing decision may include whether or not to transcode, and the degree to which the data is to be transcoded. The degree to which data is to be transcoded refers, in essence, to the amount of data that is to be discarded (or the amount of data that is to be kept) when transcoding is completed. If, for example, there are 3 levels of resolution represented by the data in a data packet that is to be transcoded, the processing decision involves whether to keep all 3 levels or to discard one (1) or two (2) levels. The processing decision may also result in the data packet being dropped in its entirety.

A processing decision may instead include whether or not to introduce redundancy into the transmitted data. For example, a decision may be made to send the same data, or the same subset of data, to different nodes. Consider data that can be separated into mutually exclusive portions A, B and C. The processing decision may be to send each portion to different nodes, to send portions A and B to one node and portions B and C to another node, or to send portions A, B and C to each of some number of other nodes.

Node 120 can make processing decisions based on the observations and measurements it has made, and node 121 can make processing decisions based on the observations and measurements it has made—that is, nodes 120 and 121 do not necessarily have to share information. Alternatively, server nodes 120 and 121 can share their observations and measurements, and each node can combine the information shared by the other node with its own measurements and observations to make processing decisions. Furthermore, the information shared by nodes 120 and 121 can include information from other nodes that the nodes 120 and 121 are in contact with or have been in contact with. For example, a node downstream or upstream of node 121 can share information with node 121, which can in turn share that information with node 120. The node downstream or upstream of node 121 may have received information from another node (e.g., another parallel node, or a node further downstream or further upstream), and so on. Node 120 can request information from node 121 (a "pull" approach) or node 121 can "push" information to node 120 (and vice versa). Processing decisions can be made based also on information about the data itself. Additional information is provided in conjunction with FIG. 5, below.

Figure 3:
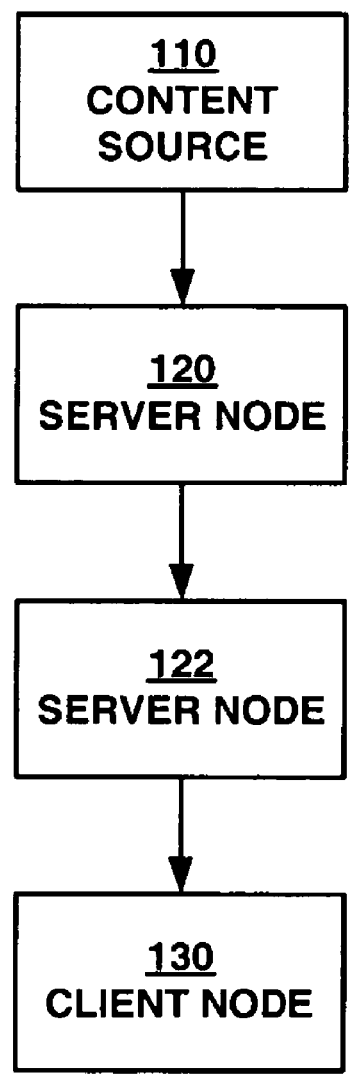
FIG. 3 is a block diagram of serial nodes in a network upon which embodiments in accordance with the present invention may be implemented.

FIG. 3 is a block diagram showing example serial server nodes 120 and 122 of network 100 (FIG. 1), upon which embodiments in accordance with the present invention may be implemented. Nodes 120 and 122 are network nodes that can be used for serial processing of a stream of data. That is, a stream of data is received at server node 120, is processed if processing is warranted, and is forwarded to server node 122 for further processing (if warranted). As above, the server nodes 120 and 122 make processing decisions (e.g., whether or not to transcode, the degree to which the data is to be transcoded, whether or not to introduce redundancy, etc.) based at least in part on network conditions respectively measured and observed by the server nodes 120 and 122, and also based on information about the data itself. Furthermore, server node 122 may share information with server node 120. The information shared by server node 122 may include information that node 122 has received from yet other nodes, in a manner similar to that described above. Additional information is provided in conjunction with FIG. 5, below.

Although FIG. 3 illustrates two serial nodes, there may be more than two serial nodes. Also, although a single stream is described, there may be many streams, each stream processed in parallel by server nodes 120 and 122. That is, each of the server nodes 120 and 122 can operate on more than one stream at a time. In essence, server nodes 120 and 122 represent a fundamental case of serial nodes, which can be extended to situations involving more than two serial server nodes and more than a single stream per node. Furthermore, there may be one or more intervening nodes situated on the paths from the content source 110 to the server node 120, and there may also be one or more intervening nodes situated on the paths from the server node 121 to the client node 130. Thus, server node 120 may receive streams from an upstream node that is not the content source, and server node 121 may send streams to a downstream node that is not the client node.

Figure 4:
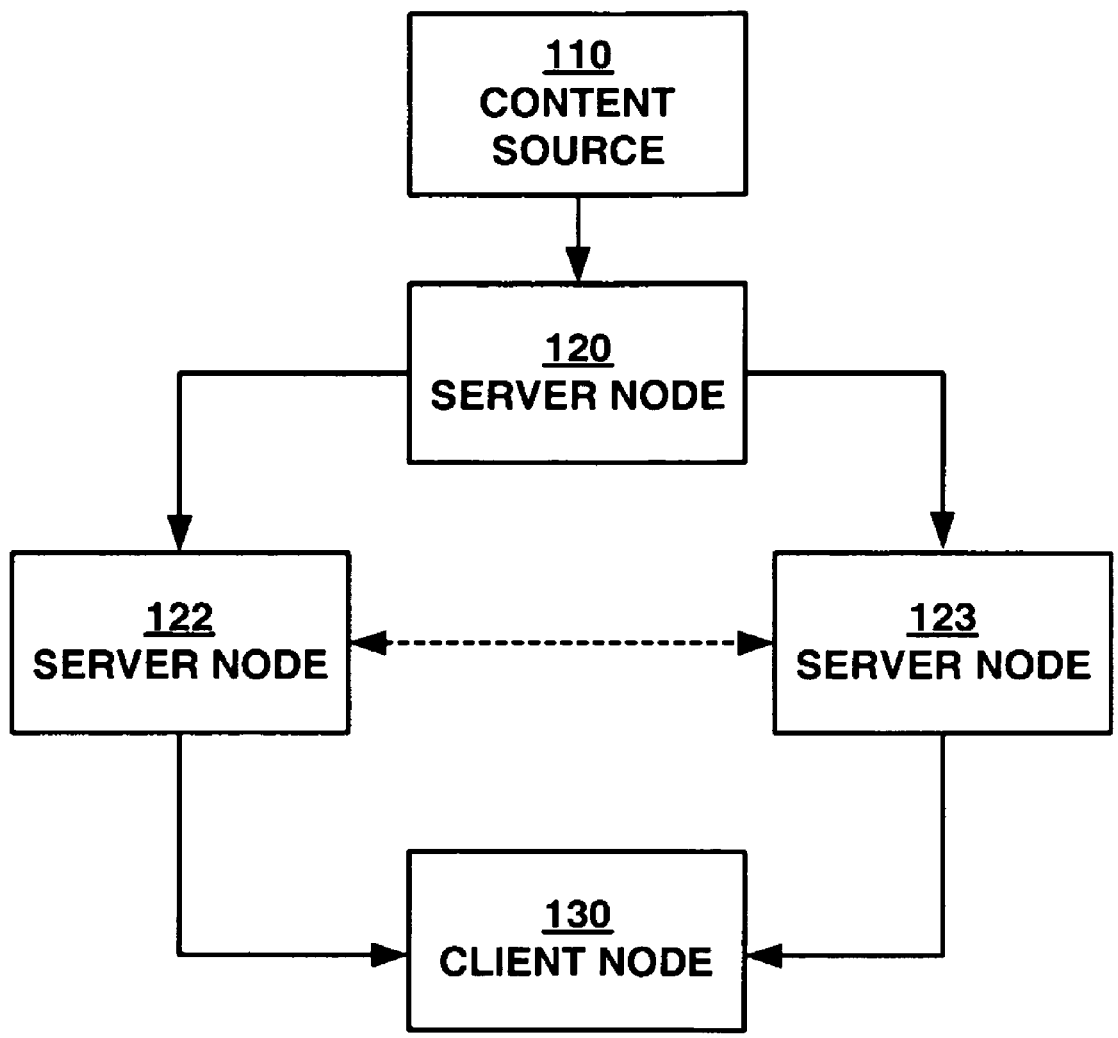
FIG. 4 is a block diagram of serial and parallel nodes in a network upon which embodiments in accordance with the present invention may be implemented.

FIG. 4 is a block diagram showing example serial and parallel nodes 120, 122 and 123 of network 100 (FIG. 1), upon which embodiments in accordance with the present invention may be implemented. Nodes 120 and 122, or nodes 120 and 123, are network nodes that can be used for serial processing of a stream of data, as described above in conjunction with FIG. 3. Nodes 122 and 123 can be used for processing parts of a stream in parallel, as described above in conjunction with FIG. 2. As above, the server nodes 120, 122 and 123 make processing decisions (e.g., whether or not to transcode, the degree to which the data is to be transcoded, whether or not to introduce redundancy, etc.) based at least in part on network conditions, and also based on information about the data itself, as described in conjunction with FIGS. 2 and 3 and as described below in conjunction with FIG. 5.

Figure 5:
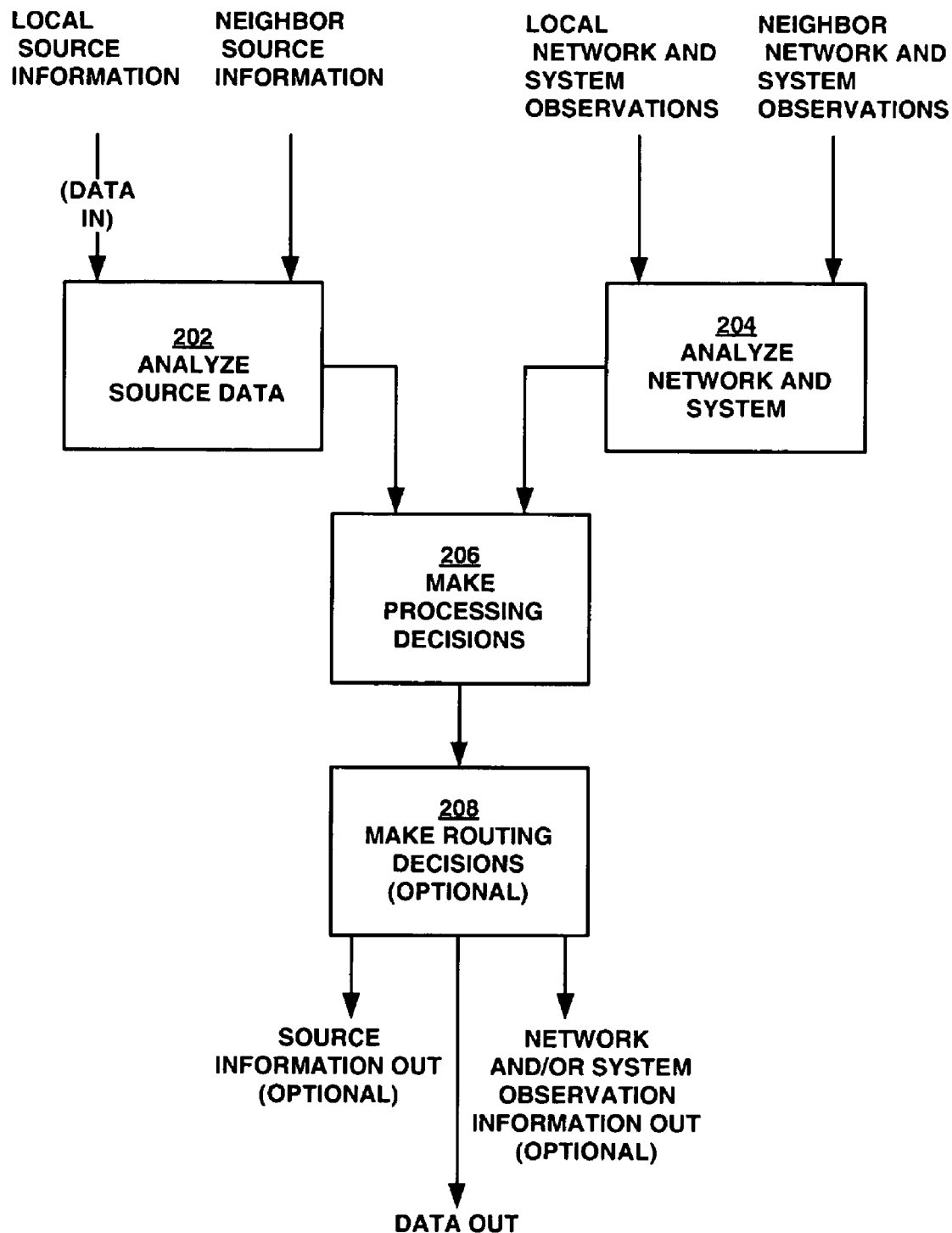
FIG. 5 diagrams the flow of information into and out of a network node in an embodiment in accordance with the present invention.

FIG. 5 diagrams the flow of information into and out of a network node 200 in an embodiment in accordance with the present invention. Network node 200 represents any of the network (processing) nodes mentioned above. Network node 200 receives data packets, makes a decision about whether or not to process the packets, makes a decision about the degree of processing to be performed (e.g., whether or not to transcode, the degree to which the data is to be transcoded, whether or not to introduce redundancy, etc.), and outputs data packets (e.g., sends them to the next downstream node, which may be another network node or the client node). In various embodiments, network node 200 makes the processing decision(s) using "local source information," "neighbor source information," "local network and system observations" (including measurements), and/or "neighbor network and system observations" (including measurements). Depending on the embodiment, all or only some of this information may be available to the network node 200.

Local source information, as used herein, refers to information about the data that is available to network node 200 from the data packets received by network node 200. For example, local source information can be information carried in, or derived from the information carried in, the header of each data packet received by network node 200. The type of information contained in packet headers has been generally described above. More specifically, local source information can include, but is not limited to, the following types of information: information identifying the beginning and end of data in a data packet; truncation points for truncating data in a data packet; information identifying the length of a data packet; information identifying a transmission time of a data packet; information identifying nominal presentation time for a data packet; information quantifying for a data packet an amount of distortion predicted to occur should the data packet not be sent or received; coding dependencies between a data packet and other data packets; information identifying for a data packet how many other data packets are dependent on the data packet; information identifying whether a data packet provides error resiliency; information identifying whether a data packet provides redundancy; information identifying a deadline for delivering a data packet; information identifying a sequence number for a data packet; prioritization information for a data packet; spatial area features of the data; color component features of the data; resolution levels of the data; quality levels of the data; content of the data; metadata describing the data; security properties of the data; and digital rights management properties of the data. Local source information associated with each particular instance of data (or data packet) is constant for that data; however, data is typically being continually sent and received, and in that respect local source information can change with time. Network node 200 may share its local source information with other nodes.

Local network observations, as used herein, refer to information about the network that is observed or measured by network node 200. More specifically, local network observations can include, but are not limited to, the following types of information for a path in the network immediately downstream of node 200: bandwidth available along the path; bottleneck link capacity along the path; data packet delivery rate; data packet loss rate; data packet received pattern; data packet loss pattern; information identifying which of the data packets were received at the next node along the path; information identifying which of the data packets did not arrive at the next node along the path; information quantifying time needed to traverse the path; and information quantifying delays associated with the path (including latency and jitter, for example). Local network observations can change with time. Network node 200 may share its local network observations with other nodes.

Local system observations, as used herein, refer to information about the network node 200, such as the availability of the node's computational resources, the degree of usage of the node's resources, and the loads on the node's resources. For example, local system observations can include, but are not limited to, system memory usage/availability, system processor usage/availability, system storage usage/availability, and system input/output (I/O) or networking usage/availability. Local system observations can change with time. Network node 200 may share its local system observations with other nodes.

Neighbor source information, as used herein, refers to information that is equivalent in nature to local source information but is received from a neighboring node or nodes. Referring back to FIG. 2, neighbor source information can be received by server node 120 from server node 121, and vice versa. With reference to FIG. 3, server node 120 can receive neighbor source information from server node 122 (because server node 122 is downstream of server node 120, neighbor source information is inherently delivered from server node 120 to server node 122). From the perspective of the local node, neighbor source information can change with time.

Neighbor source information can also include information that describes the processing decision(s) made by a neighboring node. Consider first the case of parallel nodes described in conjunction with FIG. 2, where each of the server nodes 120 and 121 receive packets with data encoded at 3 levels of resolution (low, medium and high). Server node 120, based on its observations of network conditions, may arrive at a decision to transcode the data by truncating the high resolution portions of each data packet (leaving the low and medium portions). Server node 121, based on its local network observations, may arrive at a decision to transcode data by truncating the medium and high resolution portions of each data packet. Therefore, client node 130 has no need for the medium resolution portions of data from server node 120. When server node 121 shares this information with server node 120, then server node 120 can make its transcoding decisions accordingly. In the example above, server node 120 instead arrives at a decision to transcode the data packets by also truncating the medium and high resolution portions of each data packet.

Consider now the case of serial nodes described in conjunction with FIG. 3. Server node 120 may initially send packets to server node 122 with data encoded at 3 levels of resolution. Server node 122, based on its local network observations, may arrive at a decision to transcode data by truncating the high resolution portions of each data packet. Therefore, server node 122 has no further need for the high resolution portions of the data packets being received from server node 120. When server node 122 shares this information with server node 120, then server node 120 can make its transcoding decisions accordingly. In the example above, server node 120 arrives at a decision to begin transcoding the data packets by truncating the high resolution portions of each data packet.

Neighbor network observations and neighbor system observations, as used herein, refer to information that is equivalent in nature to local network observations and local system observations, respectively, but is received from a neighboring node or nodes. Referring back to FIG. 2, neighbor network observations and/or neighbor system observations can be received by server node 120 from server node 121, and vice versa. With reference to FIG. 3, server node 120 can receive neighbor network observations and/or neighbor system observations from server node 122. Neighbor network observations and neighbor system observations can change with time.

With reference to FIG. 5, in block 202, in one embodiment, network node 200 analyzes the local source information and, in another embodiment, the network source information. In block 204, in one embodiment, network node 200 analyzes the local network observations and, in another embodiment, the neighbor network observations. In another embodiment, local system observations are analyzed in block 204. In yet another embodiment, neighbor system observations are analyzed in block 204. Various combinations of the aforementioned types of information can be analyzed by blocks 202 and 204, depending on the availability of such information.

In block 206, based on the analyses in blocks 202 and 204, network node 200 arrives at a decision about whether or not processing is to be performed and, if it is to be performed, the type or degree of processing to be performed. In general, based on the information at hand, network node 200 makes a decision about processing the data on hand. The information at hand generally includes local source information, local network observations, and/or local system observations. In one embodiment, the information at hand also includes neighbor source information, neighbor network observations, and/or neighbor system observations.

In one embodiment, the processing decision also involves a decision as to which of the packets are to be truncated or dropped. In one such embodiment, this decision is made by invoking a "sliding window" scheme. As packets are sent from the processing node, new packets will typically be arriving. Accordingly, a decision about whether or not to process and transmit a particular packet is an evolving decision that can change, depending on what other packets have arrived at the processing node since the initial decision was made. For example, consider a relatively simple example in which five (5) data packets are queued on network node 200. Based on the currently available information about the network, and perhaps as well as the information about the data carried by those 5 packets and the information about the system, a decision is made to transmit the 3 packets having the highest relative priority, as previously described herein. In the meantime, 5 more packets arrive at network node 200 while only 2 of the 3 packets have been sent, so that the queue now contains eight (8) packets. A processing decision about the 8 packets now on hand can be made using updated network and system information as well as information about the data carried by those 8 packets. The decision may be to send another 3 packets, but the 3 packets now selected may not include the packet in the first group of 3 packets that was not sent. In essence, according to one embodiment, a processing decision is made based on a snapshot of the information available to network node 200 at the time the decision is to be made, and a decision affecting the treatment of a packet can be changed (e.g., reversed) at any time. The example above can be extended to instances in which processing includes packet truncation. That is, the example above can be applied to either non-scalable or scalable data.

In one embodiment, in block 208, network node 200 makes a routing decision based on the information at hand (e.g., based on the analyses of local source information, neighbor source information, local system observations, network system observations, local network observations, and/or neighbor network observations from blocks 202 and 204). A routing decision can include a decision about which downstream node or nodes is to receive the outgoing (e.g., processed) data. For example, with reference to FIG. 4, server node 120 can allocate packets to either or both of the parallel server nodes 122 and 123. Routing decisions can also include decisions about which data packets are to be sent to which node. That is, routing decisions can involve not only determining which nodes are to receive data, but how the data is to be distributed amongst those nodes. Furthermore, the routing decision can influence the processing decision. Conversely, the processing decision can influence the routing decision. Moreover, processing and routing decisions made by the downstream nodes can influence the routing decision.

In one embodiment, network node 200 outputs source information (local and/or neighbor). In another embodiment, network node 200 outputs network observation information (local and/or neighbor). In yet another embodiment, network node 200 outputs system observation information (local and/or neighbor).

Figure 6:
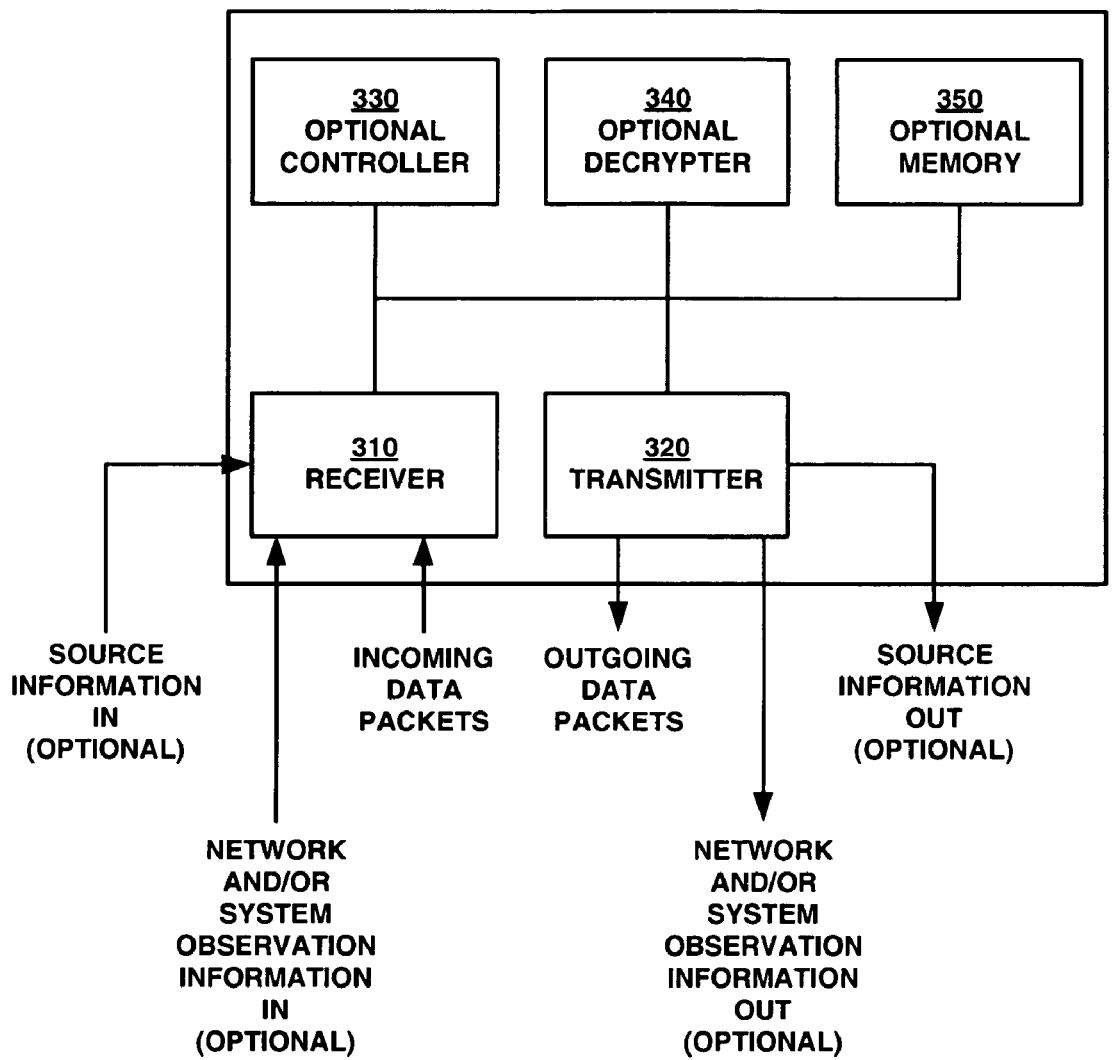
FIG. 6 is a block diagram of one embodiment of a transcoder device in accordance with the present invention.

FIG. 6 is a block diagram of one embodiment of a processing device 300 in accordance with the present invention. In this embodiment, processing device 300 includes a receiver 310 and a transmitter 320 for, respectively, receiving a stream of data packets from an upstream node and for sending a stream of data packets to a downstream node. Receiver 310 can also receive source information from another node, network observation information from another node, and/or system observation information from another node. Transmitter 320 can also transmit source information to another node, network observation information to another node, and/or system observation information to another node.

Receiver 310 and transmitter 320 are capable of either wired or wireless communication. Separate receivers and transmitters, one for wired communication and one for wireless communication, may also be used. It is appreciated that receiver 310 and transmitter 320 may be integrated as a single device (e.g., a transceiver).

Processing device 300 may include an optional controller 330 (e.g., a processor or microprocessor), an optional decrypter 340, and an optional memory 350, or a combination thereof. In one embodiment, decrypter 340 is used to decrypt header information. In another embodiment, memory 350 is used to accumulate data packets received from an upstream node before they are forwarded to a downstream node.

Figure 7:
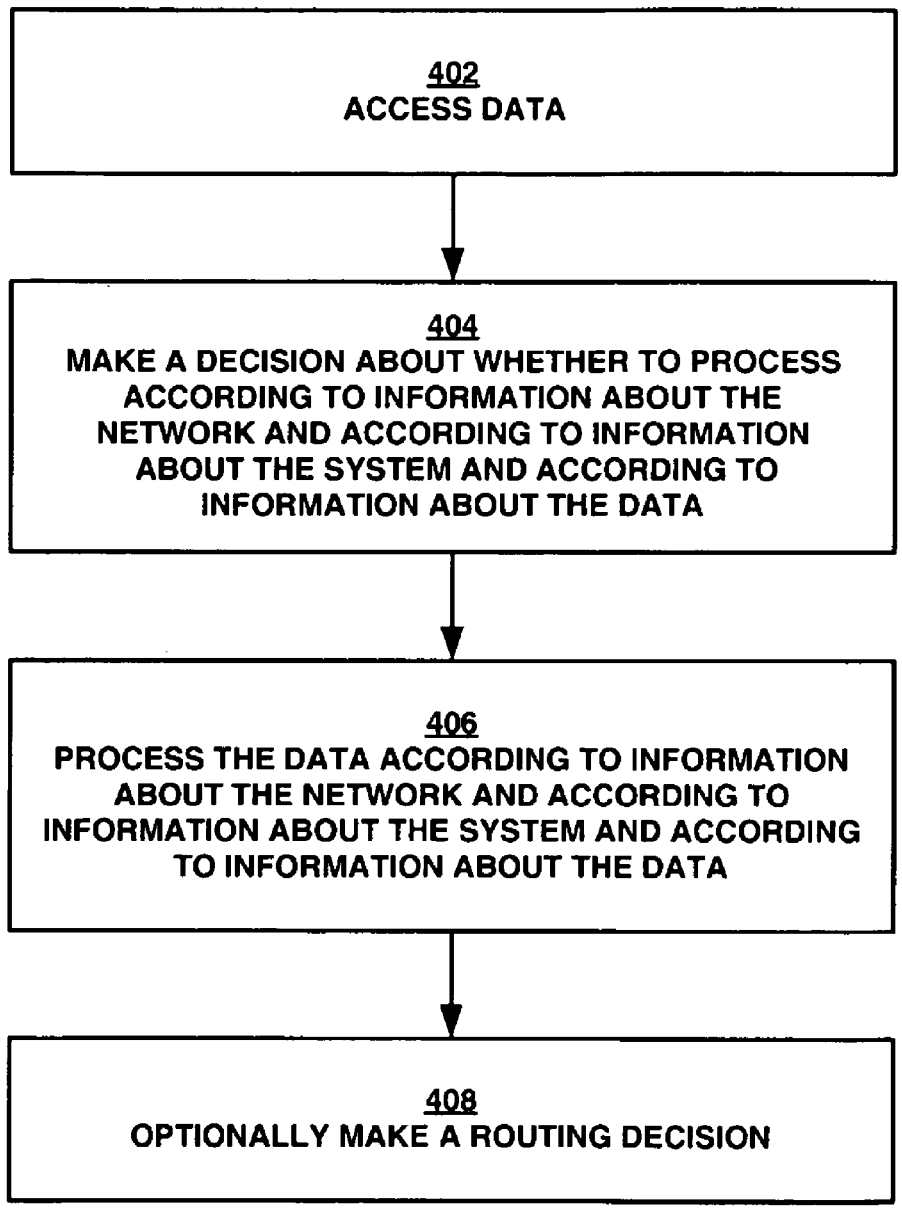
FIG. 7 is a flowchart of a method for transcoding data in serial nodes in accordance with an embodiment of the present invention.
Figure 8:
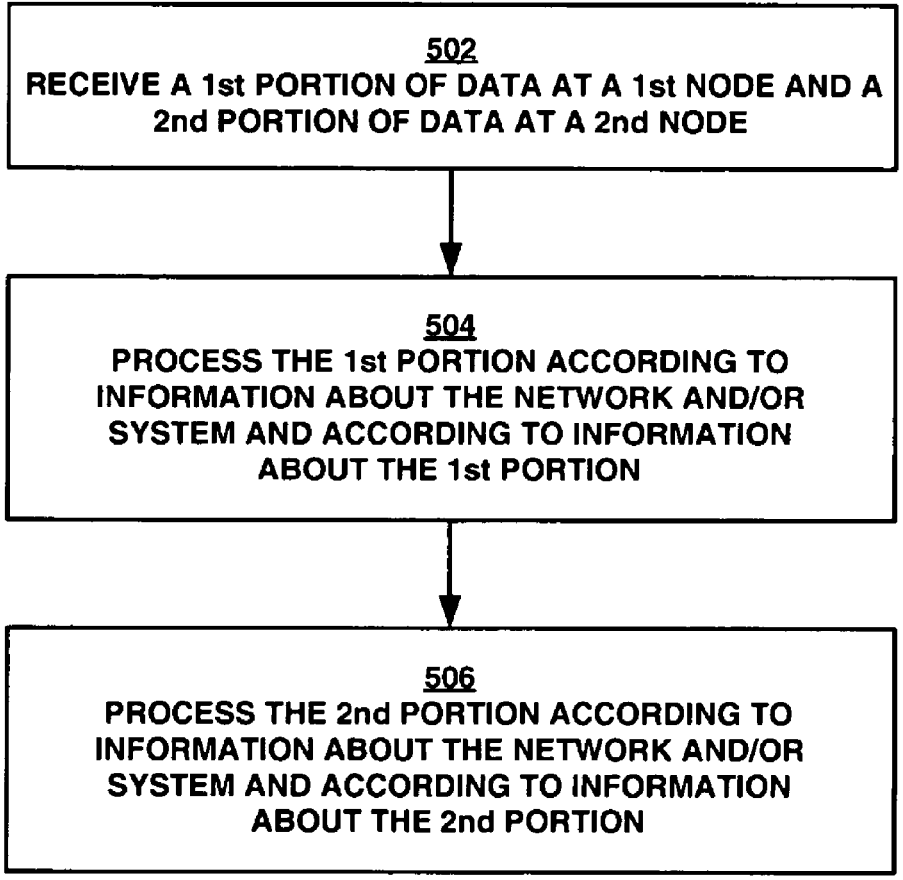
FIG. 8 is a flowchart of a method for transcoding data in parallel nodes in accordance with an embodiment of the present invention.
Figure 9:
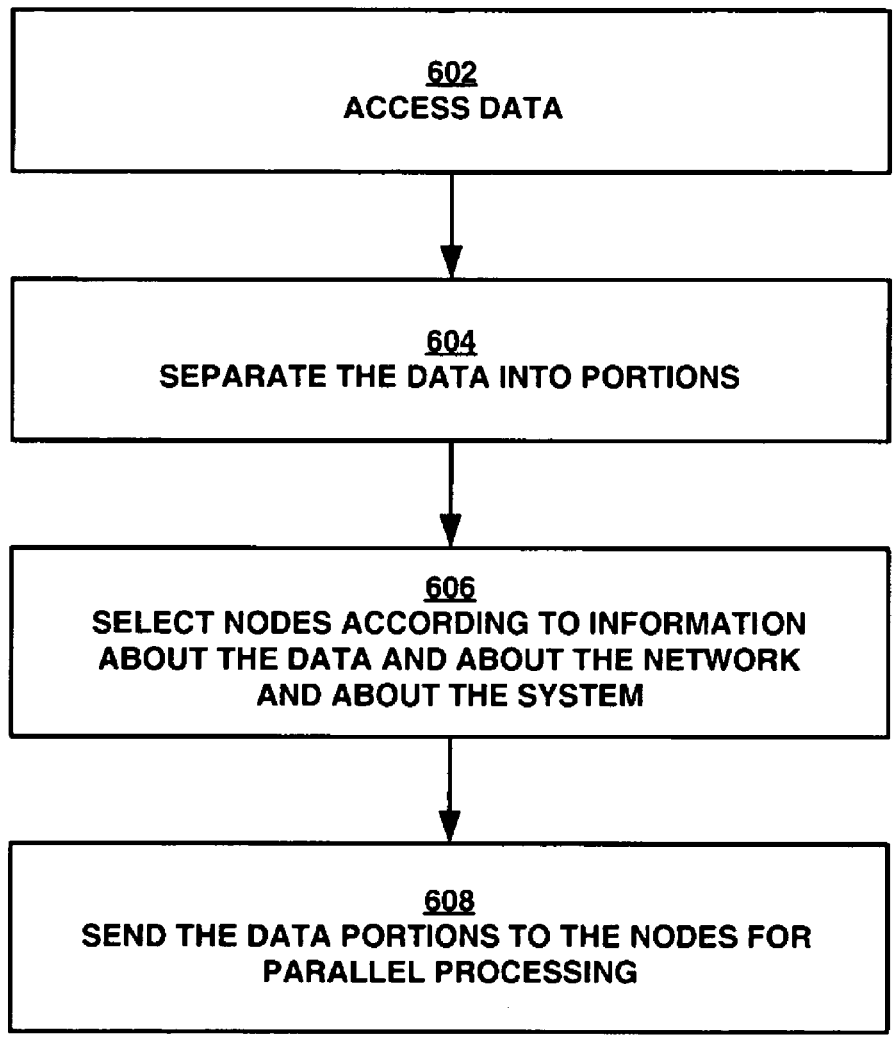
FIG. 9 is a flowchart of a method for transcoding data in serial and parallel nodes in accordance with an embodiment of the present invention.

FIG. 7 is a flowchart 400 of a method for serial processing of data in accordance with an embodiment of the present invention. FIG. 8 is a flowchart 500 of a method for parallel processing of data in accordance with an embodiment of the present invention. FIG. 9 is a flowchart 600 of a method for serial and parallel processing data in accordance with an embodiment of the present invention. Although specific steps are disclosed in flowcharts 400, 500 and 600, such steps are exemplary. That is, embodiments of the present invention are well-suited to performing various other steps or variations of the steps recited in flowcharts 400, 500 and 600. It is appreciated that the steps in flowcharts 400, 500 and 600 may be performed in an order different than presented, and that not all of the steps in flowcharts 400, 500 and 600 may be performed. All of, or a portion of, the methods described by flowcharts 400, 500 and 600 may be implemented using computer-readable and computer-executable instructions which reside, for example, in computer-usable media of a computer system.

Generally, flowchart 400 is implemented using serial nodes 120 and 122 of FIG. 3, flowchart 500 is implemented using parallel nodes 120 and 121 of FIG. 2, and flowchart 600 is implemented using the serial and parallel nodes 120, 122 and 123 of FIG. 4.

With reference first to FIG. 7, in block 402, data is accessed. In one embodiment, the data is encoded and packetized. The encoded data may be scalable or non-scalable. In another embodiment, the data is "file-based" (e.g., the data is stored in a file format, streamed from one node to another, and stored as a file on each receiving node). In yet another embodiment, the data is encrypted.

In block 404, a decision is made as to whether or not to process the data, using information about the data, information about the network, and/or information about the system (e.g., node), or a combination thereof. In one embodiment, the information about the data includes local source information, the information about the network includes local network observations, and the information about the system includes local system observations. In another embodiment, the information about the data also includes neighbor source information, the information about the network also includes neighbor network observations, and the information about the system also includes neighbor system observations. The neighbor source information, the neighbor network information, and the neighbor system observations can include information locally observed by the neighbor as well as information that the neighbor has accumulated from its neighbors.

In block 406, if the decision is to process the data, then the data is processed using information about the data, information about the network, and/or information about the system, or a combination thereof. As above, in one embodiment, the information about the data includes local source information, the information about the network includes local network observations, and the information about the system includes local system observations. In another embodiment, similar to the above, the information about the data also includes neighbor source information, the information about the network also includes neighbor network observations, and the information about the system also includes neighbor system observations. Also, as mentioned above, the neighbor source information, the neighbor network information, and the neighbor system information can include information locally observed by the neighbor as well as information that it has accumulated from the neighbor's neighbors.

In block 408, in one embodiment, a routing decision is made using information about the network. Again, in one such embodiment, the information about the network includes local network observations, while in another embodiment, the information about the network also includes neighbor network observations. In another embodiment, a routing decision is made using information about the data. In one such embodiment, the information about the data includes local source information and/or neighbor source information, including not only information locally observed by the neighbor but perhaps including information accumulated from its neighbors. In yet another embodiment, a routing decision can consider neighbor system information.

With reference now to FIG. 8, in block 502, a first portion of data is received at a first node and a second portion of data is received at a second node. In one embodiment, the first portion does not include data that is in the second portion, and vice versa. In another embodiment, the data in the first portion and the data in the second portion may overlap each other in part or in entirety. In one embodiment, the data is encoded and packetized. The encoded data may be scalable or non-scalable. In another embodiment, the data is file-based. In yet another embodiment, the data is encrypted.

In block 504, a decision is made as to whether or not to process the data, as described previously herein. If the decision is to process, then the first portion of data is processed at the first node using information about the first portion of data, information about the network, and/or information about the system (the first node), or a combination thereof. As above, in one embodiment, the information about the first portion of data includes local (first node) source information, the information about the network includes local network observations, and the information about the system includes local system observations. In another embodiment, similar to the above, the information about the first portion of data also includes neighbor source information, the information about the network also includes neighbor network observations, and the information about the system also includes neighbor system observations, including not only information locally observed by the neighbor but perhaps including information accumulated from the neighbor's neighbors. Source, network and system information may or may not be shared between the nodes.

In block 506, if the decision is to process, then the second portion of data is processed at the second node using information about the second portion of data, information about the network, and/or information about the system (the second node), or a combination thereof. As above, in one embodiment, the information about the second portion of data includes local (second node) source information, the information about the network includes local network observations, and the information about the system includes local system observations. In another embodiment, similar to the above, the information about the second portion of data also includes neighbor source information, the information about the network also includes neighbor network observations, and the information about the system also includes neighbor system observations, including not only information locally observed by the neighbor but perhaps including information accumulated from the neighbor's neighbors. Source, system and network information may or may not be shared between the nodes.

With reference now to FIG. 9, in block 602, data is accessed. In one embodiment, the data is encoded and packetized. The encoded data may be scalable or non-scalable. In another embodiment, the data is file-based. In yet another embodiment, the data is encrypted.

In block 604, the data is separated into at least a first portion and a second portion. In one embodiment, the first portion does not include data that is in the second portion, and vice versa.

In block 606, first and second network nodes are identified and selected according to information about the network, information about the data, and/or information about the system, or a combination thereof. In one embodiment, the information about the network includes local network observations, while in another embodiment, the information about the network also includes neighbor network observations, including not only information locally observed by the neighbor but perhaps including information accumulated from the neighbor's neighbors. In one embodiment, the information about the data includes local source information, while in another embodiment, the information about the data also includes neighbor source information, including not only information locally observed by the neighbor but perhaps including information accumulated from the neighbor's neighbors. In one embodiment, the information about the system includes local system observations, while in another embodiment, the information about the system also includes neighbor system observations, including not only information locally observed by the neighbor but perhaps including information accumulated from the neighbor's neighbors.

In block 608, the first portion of data is sent to the first network node for processing, and the second portion of data is sent to the second network node for processing.

Storing Data from A Plurality Of Streams Into A Single Storage Location

Figure 10:
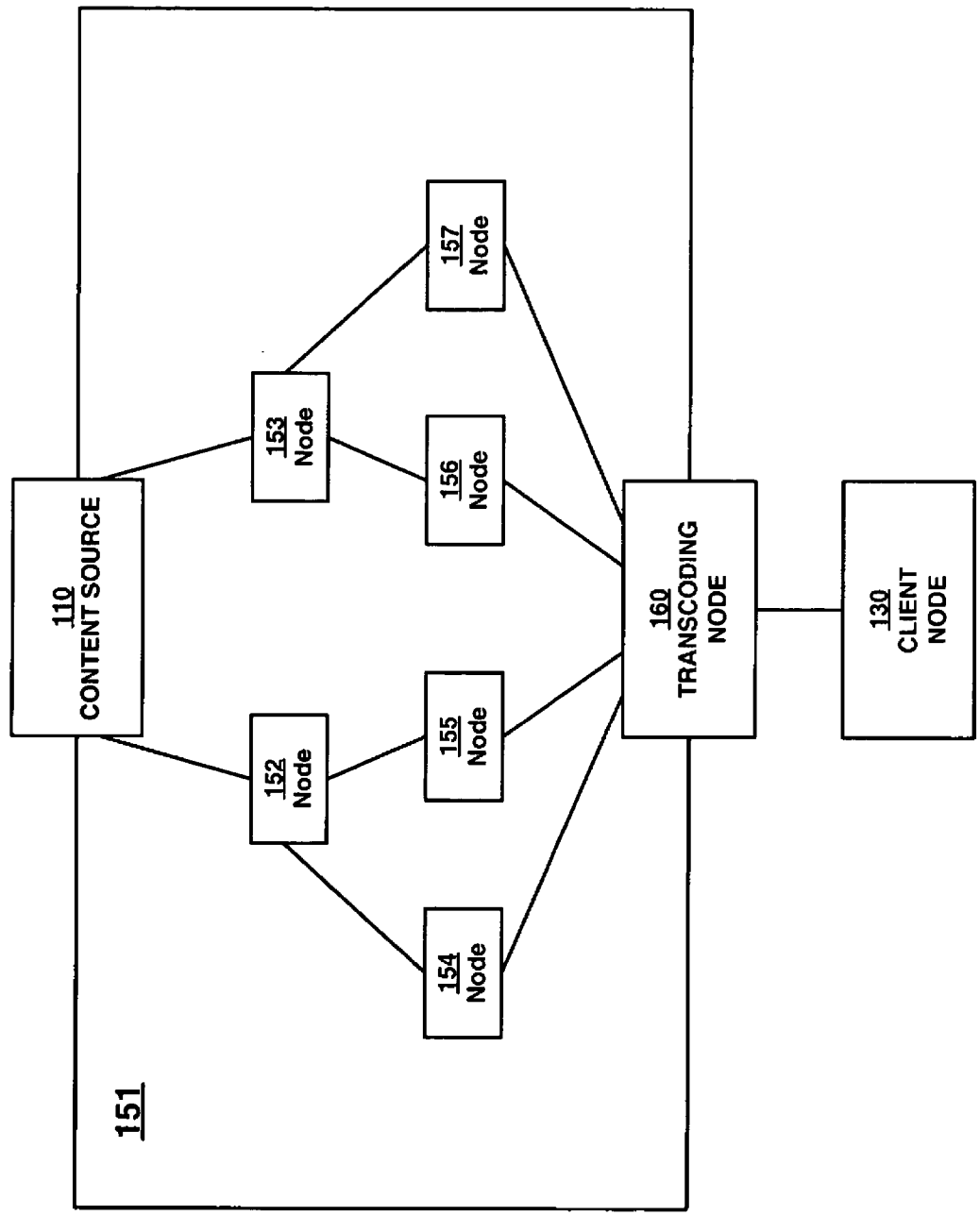
FIG. 10 is a block diagram of a second network upon which embodiments in accordance with the present invention may be implemented.

Although some embodiments described herein utilize transcoding nodes in a plurality of location throughout the network, it is appreciated that the utilization of a single transcoding node as shown in FIG. 10 allows a standard (or previously established) non-transcoding node network configuration to be utilized without requiring significant upgrade to the network or components therein. In addition, the utilization of a network having only a single transcoding node is representative of a smaller portion of a larger network having a collaboration of transcoding and non-transcoding nodes. For example, the network 151 may in one embodiment, be representative of any or all of the server nodes (e.g., 120-123) of FIG. 1. That is, it should be understood that each server node 120-123 might be indicative of a complete network of nodes such as network 151 having a single transcoding node providing the output thereof. Note that generally the transcoding node may be in the middle of the network, not necessarily closest to the client as illustrated in FIG. 10. However, in another embodiment, the transcoding node is the sender, e.g., the streaming server and is not in the middle of the network. In yet another embodiment, the transcoding node is the client.

Figure 13A:
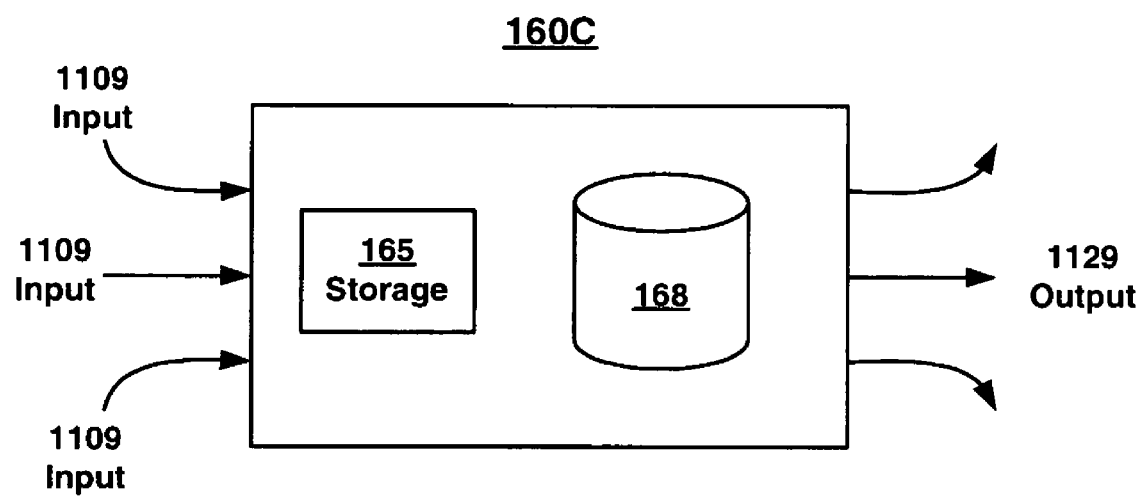
FIG. 13*a* is a block diagram of transcoding node having a database and tag storage thereon upon which embodiments in accordance with the present invention may be implemented.
Figure 13B:
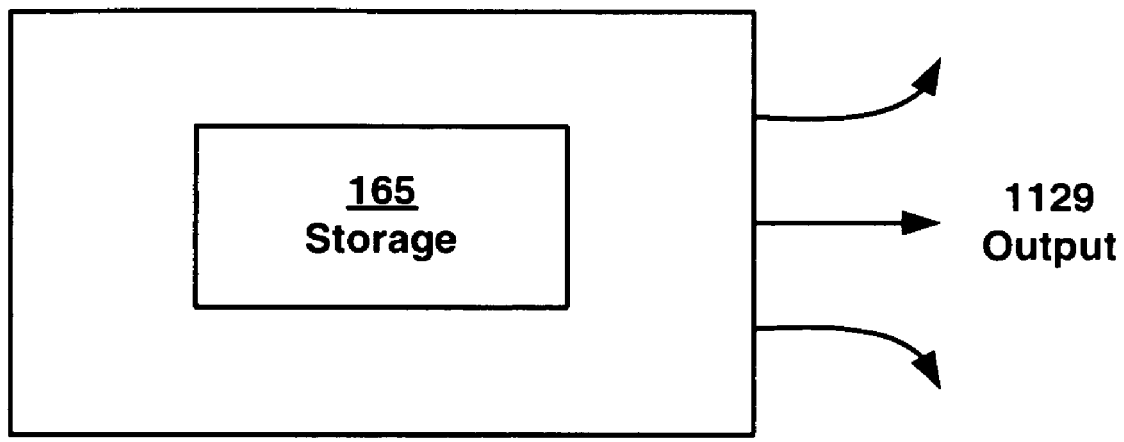
FIG. 13*b* is a block diagram of an exemplary sending transcoding node upon which embodiments in accordance with the present invention may be implemented.

For example, as shown in FIG. 13b, a server streaming multiple streams 1129 with an output bandwidth constraint can adapt across the multiple streams to determine which packets to send/discard/truncate in order to maximize the total quality seen by all the clients subject to the output bit rate constraint. This processing across multiple streams can lead to significant gains in performance.

Therefore, processing across multiple streams could be performed at (1) a mid-network transcoder (transcoding across the multiple streams passing through the mid-network node), or (2) at a streaming server (adapting the streaming across multiple streams), or (3) when a node acts simultaneously as a mid-network node and as a sender (some streams pass through it and it also originates and sends some streams).

A set of multiple streams may consist of individual streams which are encrypted or unencrypted, scalably coded or non-scalably coded, and may correspond to video, image, speech, audio, graphics, or other forms of media or non-media data. An individual media stream may be partially encrypted and partially non-encrypted, or may be partially scalably coded and partially non-scalably coded. The multiple streams may be any mixed combination of the above.

As described herein, and shown in FIG. 10, the content source 110 passes the data in portions of data across the network 151 to the client node 130 in operation similar to that of FIG. 1. That is, the content source 110 disseminates the portions of data across a network of media streams and nodes (152-157) where it can be regrouped at the transcoding node 160. Note that is it possible to transcode even when only a portion of the data is available. Therefore it is not necessary to regroup all of the data to perform the processing. In one embodiment, the transcoding node 160 is a server node such as server nodes 120-123 described in detail herein that carries out processing operations as described in detail herein. Thus, as described herein, the transcoding node 160 may be a computer system as well as another type of device that may not be typically considered a computer system but has similar capabilities.

In general, as described herein, the transcoding node 160 is in one embodiment, a network node that can perform processing of portions of data received from a plurality of media streams. That is, in one embodiment, a plurality of streams is received at the transcoding node 160. The streams provide at least one and normally a plurality of portions of data to the transcoding node 160.

Normally, the dissemination of the portions of data (e.g., data packets and the like) through different media streams allows a dissemination of traffic across a network. This dissemination can result in increasing throughput for the network since the data is not congested on the same path. This capability is even more valuable if one path in a network is slowed, clogged, or otherwise not operating at normal capacity. Additionally, the dissemination of the data into portions of data traveling different routes across the network 151 will increase the security of the network since each node 152-157 of the network 151 will only receive a portion of the overall data file. In one embodiment, the user may explicitly select the dissemination of the data packets across the network. In another embodiment, the network router may perform the spreading of data packets across the network.

A problem that may arise is that node 160 receives a plurality of media streams as input but has an output bandwidth constraint which is lower than the total received bandwidth. For example, the transcoding node 160 receives a plurality of input streams which correspond to a total received bit rate of 500 kb/s, but the output bandwidth is limited to 400 kb/s. The transcoding node 160 will begin to store and process the data when it is not able to output the data at the same rate that it is incoming. In one embodiment, this will occur when the number (or the available bandwidth) of the media outputs are less than the number (or the available bandwidth) of the media inputs. When this imbalance occurs, an appropriate technique is required to ensure that the portions of data do not bottleneck, and that too many of the portions of data are not dropped. As described in detail herein, one embodiment for overcoming the above problem is to process the data to ensure that the appropriate portions of data are output to ensure that the receiving clients receive useable (if reduced in quality) streams.

For example, as described herein, when the load becomes unbalanced (e.g., more in than out) a decision is required about whether or not to process the packets, a decision about the degree of processing to be performed (e.g., how much of a packet to truncate and which packet(s) to truncate, or how many packets to drop and which packets to drop), and which packets to output (e.g., sends them to the next downstream node, which may be another mid-network node or the client node). In various embodiments, transcoding node 160 makes the processing decision(s) using "local source information," "neighbor source information," "local network observations" (including measurements), and/or "neighbor network observations" (including measurements). Depending on the embodiment, all or only some of this information may be available to the transcoding node 160.

Figure 11:
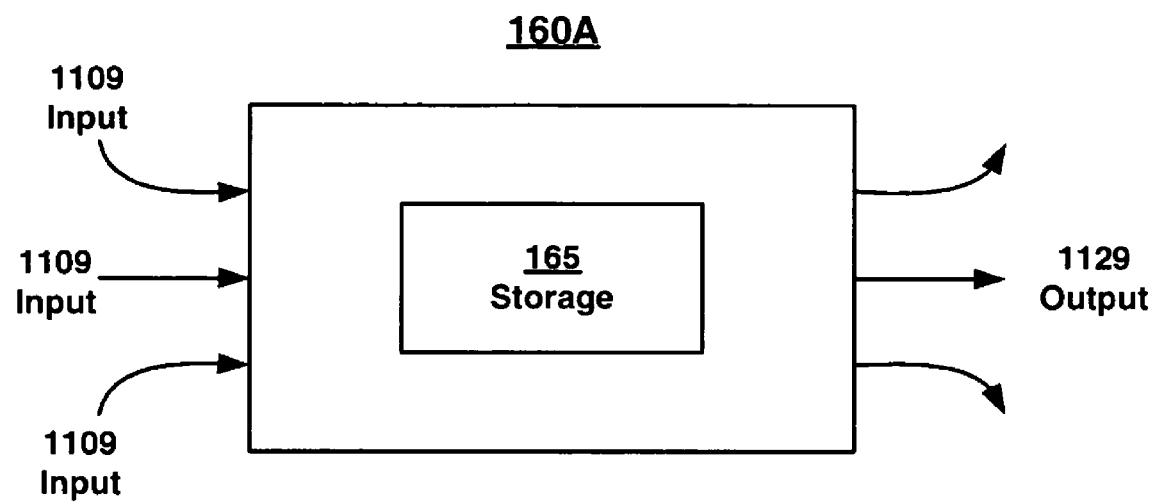
FIG. 11 is a block diagram of transcoding node having a single storage location thereon upon which embodiments in accordance with the present invention may be implemented.
Figure 14:
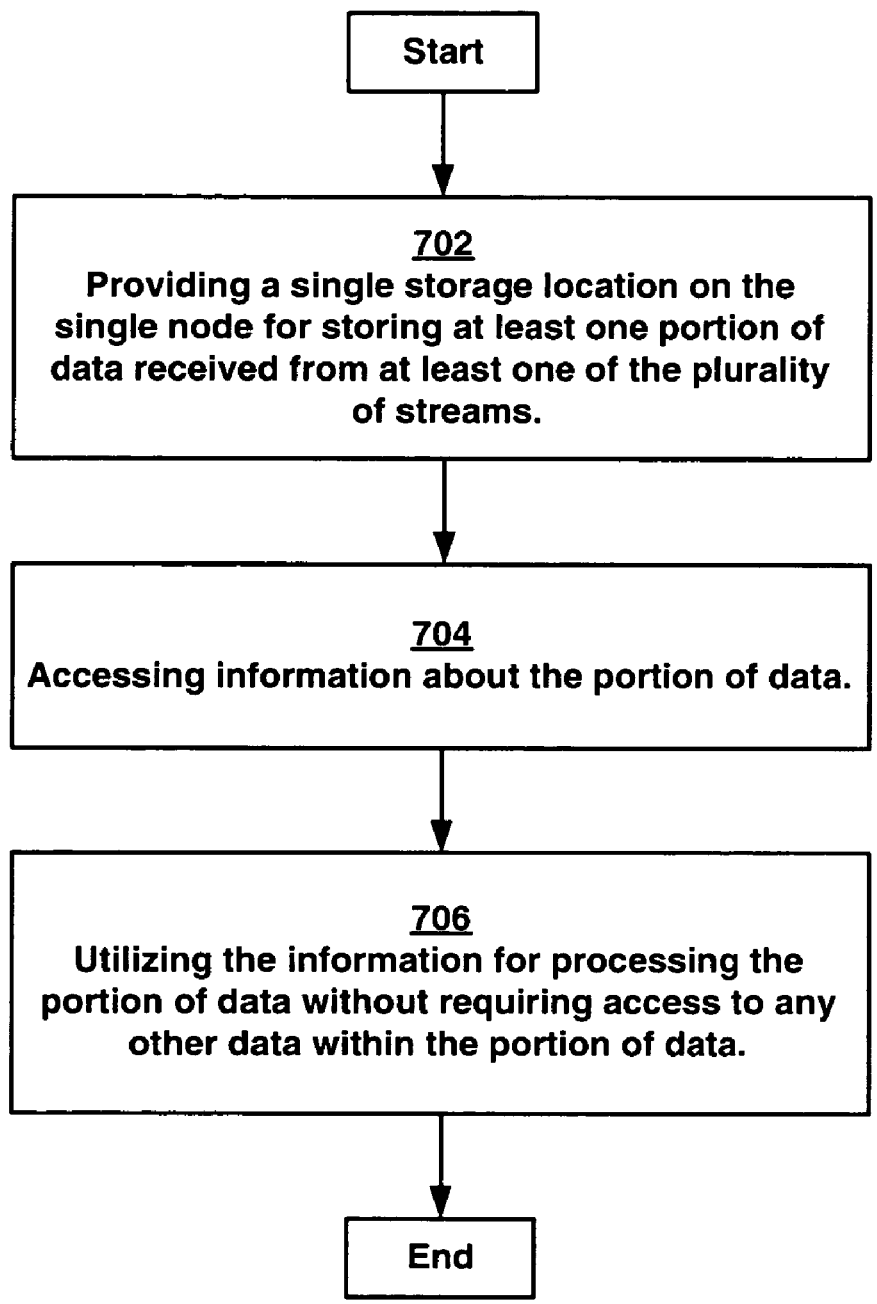
FIG. 14 is a flowchart of a method for transcoding data from a plurality of data streams at a transcoding node having a single storage location in accordance with an embodiment of the present invention.

With reference to FIG. 11 and to FIG. 14, in block 702, a single storage location is provided on a transcoding node for storing at least one portion of data received from at least one of a plurality of streams. That is, each portion of data, packet of data or the like, goes into a single storage location (e.g., bucket or buffer or some form of memory or storage) 165 regardless of the input stream 1109 from which it was received. In one embodiment, the data is encoded and packetized. The encoded data may be scalable or non-scalable coded. The data may also be unencoded (raw format). In another embodiment, the data is encrypted.

In block 704, information about the portion of data is accessed. In one embodiment, the information about the portion of data is stored in a packet header (or metadata file such as a hint track, or in the payload of another packet, or other similar feature) described in detail herein. That is, instead of actually accessing the data within the data packet, the transcoding node will access the header (or metadata or hint track information, etc) providing an overview of the data packet layout. For example, this information may include whether the data is scalably or non-scalably coded, what is the level of scalability, where are the truncation points located, the importance of the data, and the like.

In one embodiment, information about the portion of data also includes accessing the R-D information described herein. That is, the rate evaluation to determine the size of the portion of data and/or the distortion evaluation for determining the value of the data in the packet, both of which are described in detail herein.

In block 706, one embodiment utilizes the information for processing the portion of data without requiring access to any other data within the portion of data. That is, if the decision is to process the data, then the data is processed using information about the data and information about the network. For example, the degree to which data is to be transcoded refers, in essence, to the amount of data that is to be discarded (or the amount of data that is to be kept) when processing is completed. If, for example, there are 3 levels of resolution represented by the data in a data packet that is to be transcoded, the transcoding decision involves whether to keep all 3 levels or to discard one (1) or two (2) levels. The transcoding decision may also result in the data packet being dropped in its entirety. In another example, the original media stream may require 100 kb/s, but there may be an output bandwidth constraints of 80 kb/s, therefore requiring the transcoding node to reduce the output bitrate to fit within the available bandwidth.

As described herein, in one embodiment, additional information which may be used to direct the processing includes local source information, and the information about the network includes local network observations. In another embodiment, similar to the above, the information about the data also includes neighbor source information, and the information about the network also includes neighbor network observations.

By utilizing the information about the portion of data (e.g., the packet header or the like) to process the portion of data instead of actually accessing the data within the portion of data, the present single node transcoder 160A is capable of processing the portions of data regardless of whether the portions of data are encrypted. For example, if the portion of data is encrypted in a progressive encryption format with scalable coding as described herein, and the scalable coding is provided in the information (e.g., header or the like) then the transcoding node can truncate the scalable portion of data without ever decrypting the portion of data.

In another embodiment, the information about the portion of data (e.g. the header or hint track or other form of metadata) may be encrypted using a different encryption algorithm than that of the rest of the data within the portion of data. Therefore, this information can be decrypted for evaluation and use while the data itself remains encrypted. In this manner, the security of the data at the transcoding node is preserved.

Since, in one embodiment, the portions of data within the transcoding node 160A are stored in a single storage location, regardless of the input media stream 1109, the data packets are placed in queue when they are received and are processed in order. That is, as a data packet comes in it is placed in queue and as a data packet is output 1129 the queue moves one place forward (or if a plurality of packets are output, e.g., 10 packets, then the queue advances by 10). In another embodiment, the data packets are organized in a different manner when they are received. For example, placed in queue by time and size, or importance, or importance normalized by size, or other metrics that are defined by the transcoding node 160A.

Figure 12:
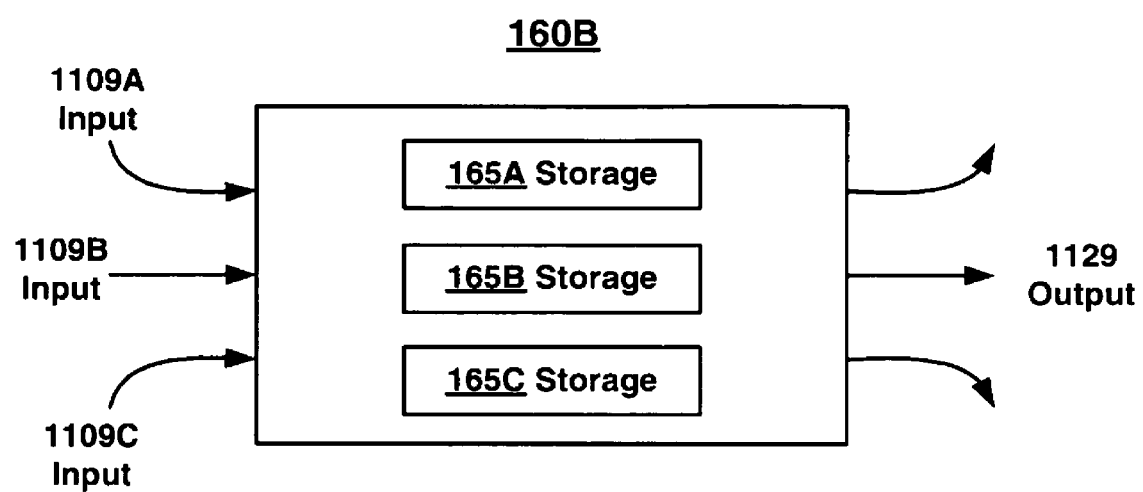
FIG. 12 is a block diagram of transcoding node having a plurality of storage locations thereon upon which embodiments in accordance with the present invention may be implemented.

With reference now to FIG. 12, a transcoding node 160B is shown receiving a plurality of input streams 1109. However, unlike the transcoding node 160A, transcoding node 160B will retain the portions of data in actual or virtual (or a combination of actual or virtual) storage locations. That is, the portion of data will be maintained not only in the order it was received but also with reference to the media stream from which it arrived. For example, the media received on a first input 1109A will be stored in a first storage location 165A, the media received on a second input 1109B will be stored in a second storage location 165B and the media received from a third input 1109C will be stored in a third storage location 165C.

Therefore, when the incoming media streams 1109 are providing packets of data at a constant rate, the transcoding node 160B will begin to store the data when it is no longer able to output the data at the same rate that it is incoming. In one embodiment, this will occur when the number (or the available bandwidth) of output 1129 is less than the number (or the available bandwidth) of inputs 1109.

When this input/output imbalance occurs, an appropriate technique is required to ensure that the portions of data do not bottleneck, and that too many of the portions of data are not dropped. As described in detail herein, one embodiment for balancing the load is to process the data to ensure that appropriate portions of data are output to ensure the receiving client nodes receive useable (if reduced in quality) streams.

Figure 15:
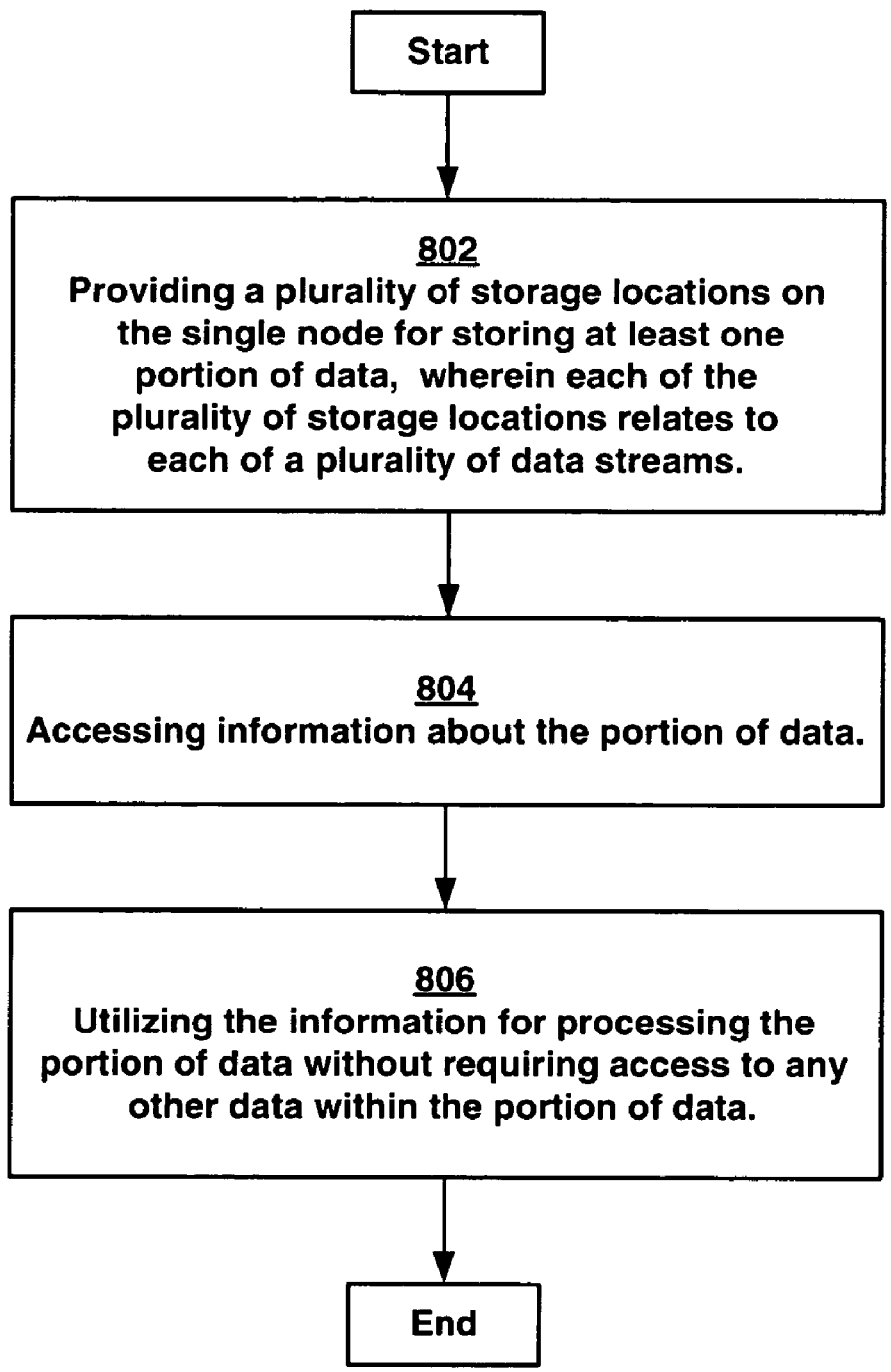
FIG. 15 is a flowchart of a method for processing data from a plurality of data streams at a transcoding node having a plurality of storage locations in accordance with an embodiment of the present invention.

With reference to FIG. 12 and to FIG. 15, in block 802, a plurality of storage locations 165A-165C are provided on a transcoding node for storing at least one portion of data received from at least one of a plurality of streams wherein each of said plurality of storage location relates to each of said plurality of data streams. That is, as described herein, the portion of data will be maintained not only in the order it was received but also with reference to the media stream from which it arrived. For example, the media received on a first input 1109A will be stored in queue at a first (physical or virtual) storage location 165A, the media received on a second input 1109B will be stored in queue at a second storage location 165B and the media received from a third input 1109C will be stored in queue at a third storage location 165C. In one embodiment, the data is encoded and packetized. The encoded data may be scalable or non-scalable coded. In another embodiment, the data is encrypted. The data may also be uncoded (raw format).

In one embodiment, tracking the portion of data in conjunction with each media stream 1109 from which it was received is a matter of keeping track of the 4-tuple {source IP address, source port, destination IP address, port destination} for each stream. This information can be maintained by creating logical buffers where the IP addresses and the port numbers are used as stream identifiers. In one embodiment, this information may be a part of a database or be amended to (or read from) the header information of the data packet.

In block 804, information about the portion of data is accessed. In one embodiment, the information about the portion of data is stored in a header (or hint track or metadata or similar feature) described in detail herein. That is, instead of actually accessing the data within the data packet, the transcoding node will access the header providing an overview of the data packet layout. For example, the header will include information such as, is the data scalable or non-scalable, what is the level of scalability, where the truncation points are located, the importance of the data, and the like.

In one embodiment, information about the portion of data also includes accessing the R-D information described herein. That is, the rate evaluation to determine the size of the portion of data and/or the distortion evaluation for determining the value of the data in the packet, both of which are described in detail herein.

In block 806, one embodiment utilizes the information for processing the portion of data without requiring access to any other data within the portion of data. That is, if the decision is to process the data, then the data is processed using information about the data and information about the network. For example, the degree to which data is to be processed refers, in essence, to the amount of data that is to be discarded (or the amount of data that is to be kept) when processing is completed. If, for example, there are 3 levels of resolution represented by the data in a data packet that is to be processed, the processing decision involves whether to keep all 3 levels or to discard one (1) or two (2) levels. The processing decision may also result in the data packet being dropped in its entirety. As described herein, in one embodiment, the information about the data includes local source information, and the information about the network includes local network observations. In another embodiment, similar to the above, the information about the data also includes neighbor source information, and the information about the network also includes neighbor network observations.

By utilizing the information about the portion of data (e.g., the header or the like) to process the portion of data instead of actually accessing the data within the portion of data, the present single node transcoder 160B is capable of processing the portions of data regardless of whether the portions of data are encrypted. For example, in one embodiment, if the portion of data is encrypted in a progressive encryption format with scalable coding as described herein, and the scalable coding is provided in the information (e.g., header or the like) then the transcoding node can truncate the scalable portion of data without ever decrypting the portion of data. Although progressive encryption is stated herein, it is understood that a plurality of encryption methods may be utilized in conjunction with the embodiments described herein. Progressive encryption is used herein merely for purposes of brevity and clarity.

In another embodiment, the information about the portion of data (e.g. the header or hint track or other form of metadata) may be encrypted using a different encryption algorithm than that of the rest of the data within the portion of data. Therefore, this information can be decrypted for evaluation and use while the data itself remains encrypted. In this manner, the security of the data at the transcoding node is preserved Since, in one embodiment, the portions of data within the transcoding node 160B are stored in a plurality of storage locations based on the input media stream 1109, the data packets are placed in queue when they are received and are processed in order based on the stream from which they were received. That is, as a data packet comes in it is placed in queue and as a data packet is output the queue moves one place forward (or if a plurality of packets are output, e.g., 10 packets, then the queue advances 10) on a per stream basis.

By specifically keeping track of each stream and exploiting that information when the packets are sent out, the transcoding node 160B is able to exploit the diversity of the different streams for performing the processing. For example, it is possible to share the processing effects evenly across the media streams, e.g. instead of unknowingly processing a plurality of data from a single data stream input 1109A, the transcoding node 160B can ensure that a portion of data is processed from each media stream e.g., 1109A-1109C.

More importantly, the processing may be performed across the different media streams in order to provide more sophisticated capabilities. For example, the processing may be performed across streams to fairly share the resulting distortion across all of the streams, e.g. so that each stream is affected by the same amount of distortion. As another example, the processing may be performed across the different streams in order to minimize the total distortion seen across all of the streams (in this case each stream may be affected by a different distortion, but the total distortion summed up over all of the streams is minimized). As another example, the processing may be performed across the different streams in order to minimize the maximum distortion that afflicts any single stream. An another example, different streams may have different quality of service requirements (e.g. each stream may have a different maximum acceptable distortion), and therefore the processing may be performed across the different streams in order to appropriately meet the QoS requirement for each stream, e.g. to limit the maximum distortion for each stream to the appropriate value.

With reference now to FIG. 13a, a transcoding node 160C is shown receiving a plurality of input streams 1109. However, the transcoding node 160C may have an output bandwidth constraint that is lower then its received input bandwidth. Therefore, when the incoming media streams 1109 are providing packets of data at a constant rate, the transcoding node 160C will begin to store the data when it is no longer able to output the data at the same rate that it is incoming. In one embodiment, this will occur when the number (or the available bandwidth) of output 1129 is less than the number (or the available bandwidth) of inputs 1109.

When this input/output imbalance occurs, an appropriate technique is required to ensure that the portions of data do not bottleneck, and that too many of the portions of data are not dropped. As described in detail herein, one embodiment for balancing the load is to process the data to ensure that appropriate portions of data are output to ensure the receiving client nodes receive useable (if reduced in quality) streams.

In general, the transcoding node 160C is capable of operating in the single storage method such as transcoding node 160A, or utilizing a plurality of actual or virtual (or a combination of actual or virtual) storage locations such as describe in transcoding node 160B. However, unlike transcoding nodes 160A and 160B, transcoding node 160C utilizes a database to store the information from the portion of data (e.g., the header or the like). That is, node 160C initially reads the information (e.g., header or the like) and stores the information (e.g., R-D information, network information, and the like) in a database. A portion of data (or data packet) is then tagged with a pointer referring to the database entry. For example, string 1—rate information, string 2—distortion information and the like. By initially reading and storing the information about the data packet, the transcoding process can be more efficient since there is no need to re-read all the header information again at a later time.

Figure 16:
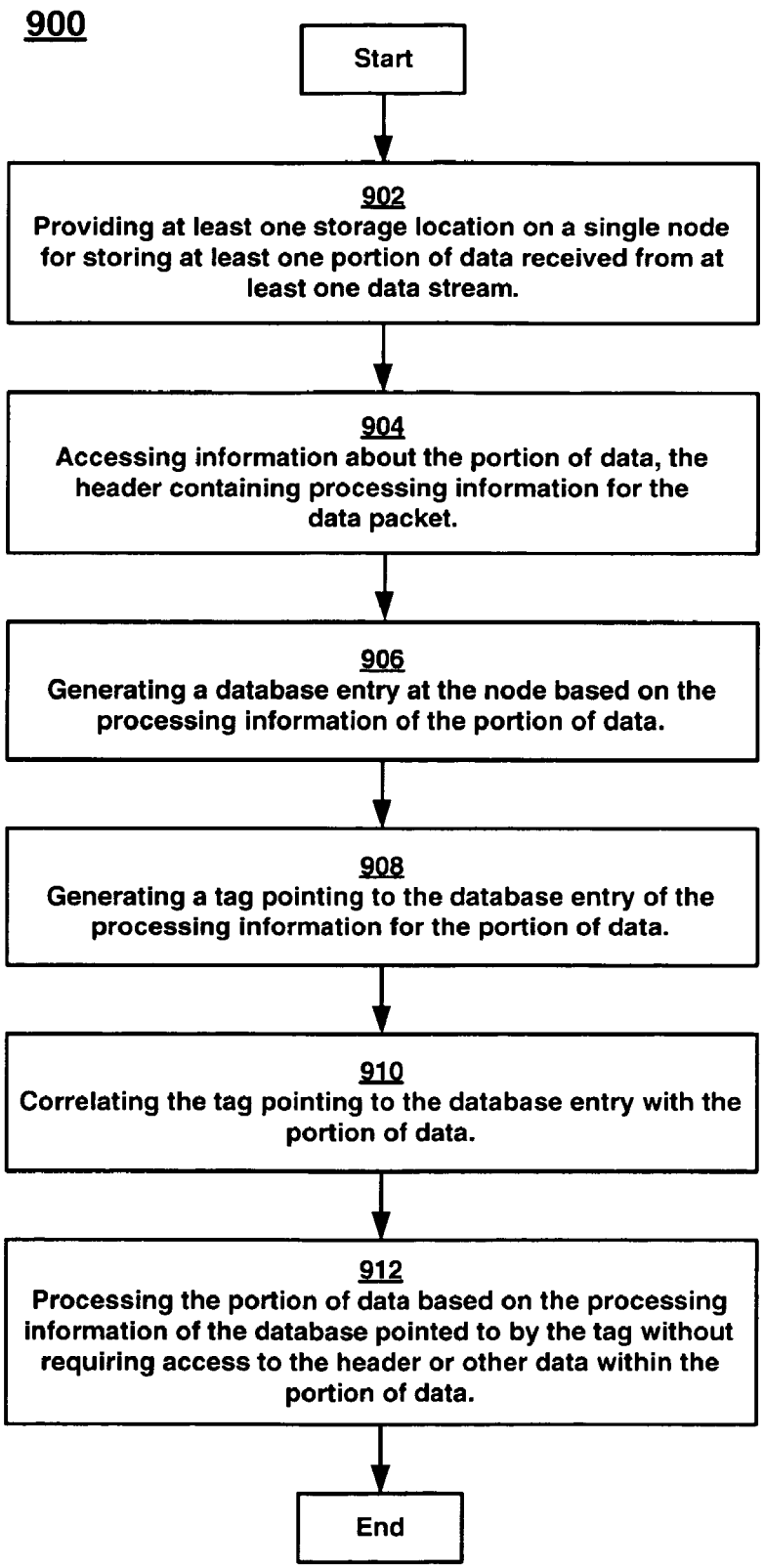
FIG. 16 is a flowchart of a method for transcoding data from a plurality of data streams at a transcoding node utilizing a database and tag organization in accordance with an embodiment of the present invention.

With reference to FIG. 12 and to FIG. 16, in block 902, at least one storage location 165 is provided on a transcoding node for storing at least one portion of data received from at least one of a plurality of streams. In another embodiment, as described herein, each of said plurality of storage locations will relate to each of said plurality of data streams. That is, as described herein, the portion of data may be maintained in a single storage location in the order it was received or with reference to the media stream from which it arrived and the order in which it was received.

In block 904, information about the portion of data is accessed. In one embodiment, the information about the portion of data is stored in a header (or similar feature) described in detail herein. That is, instead of actually accessing the data within the data packet, the transcoding node will access the header providing an overview of the data packet layout. For example, the header will include information such as, is the data scalable or non-scalable, what is the level of scalability, where the truncation points are located and the like.

In one embodiment, information about the portion of data also includes accessing the R-D information described herein. That is, the rate evaluation to determine the size of the portion of data and/or the distortion evaluation for determining the value of the data in the packet, both of which are described in detail herein.

In block 906, a database 168 entry is generated at the transcoding node 165C based on the information about the portion of data. In one embodiment, the information is R-D information from the header or hint track or metadata or similar information. In block 908, a tag is generated to point to the database entry of the information about the portion of data. In block 910, the tag generated to point to the database entry is correlated with the portion of data.

In block 912 one embodiment utilizes the tag and database for processing the portion of data without requiring access to any other data within the portion of data and without requiring re-reference of the information accompanying the portion of data (e.g., the header or the like). That is, if the decision is to process the data, then the data is processed using the database and tag. For example, the degree to which data is to be processed refers, in essence, to the amount of data that is to be discarded (or the amount of data that is to be kept) when processing is completed. If, for example, there are 3 levels of resolution represented by the data in a data packet that is to be transcoded, the transcoding decision involves whether to keep all 3 levels or to discard one (1) or two (2) levels. The processing decision may also result in the data packet being dropped in its entirety. As described herein, in one embodiment, the information about the data includes local source information, and the information about the network includes local network observations. In another embodiment, similar to the above, the information about the data also includes neighbor source information, and the information about the network also includes neighbor network observations.

By utilizing the tag to process the portion of data instead of actually accessing the header, the data within the portion of data, or the like, the present single node transcoder 160C is capable of processing the portions of data regardless of whether the portions of data are encrypted. For example, if the portion of data is encrypted with scalable coding as described herein, and the scalable coding is provided in the database then the transcoding node can truncate the scalable portion of data without ever decrypting the portion of data. In another embodiment, the information about the portion of data may be encrypted in a different encryption algorithm than that of the rest of the data within the portion of data. Therefore, the header (in one case) can be decrypted for evaluation and storage while the rest of the data within the data packet remains encrypted. Therefore, security of the data at the transcoding node 160C is retained.

Since, in one embodiment, the portions of data within the transcoding node 160C are stored in a plurality of storage locations based on the input media stream 1109, when the tag is generated, the database entry can also include the data packets location in queue, e.g., when they are received, and can thereby increase efficiency by helping to ensure the data packets are processed in order based on the time and/or stream from which they were received. In addition, by utilizing the database and associated tag, it is possible to keep track of the packets of data without utilizing a queue or multiple storage location method. That is, since the database is linear, e.g., a second entry cannot be entered before a first entry, the process of outputting the portions of data based on the database is linear by default. That is, as a packet is removed from the database, the list moves up one (or more). Therefore, complex or meticulous storage methods are not necessary when the database and tag method is utilized.

In summary, in its various embodiments, the present invention provides methods and systems for streaming media data in a network. The data is processed to accommodate diverse client capabilities. If the data is encrypted, it can be processed without decryption, thereby maintaining the security of the data. Processing decisions are based on many items of information that capture the nature of the network's heterogeneous and time-varying communication links. The likelihood that packets may be lost or delayed is reduced, by balancing processing operations across server nodes and, in some instances, by conducting processing operations in parallel.

Embodiments of the present invention are thus described. While the present invention has been described in particular embodiments, it should be appreciated that the present invention should not be construed as limited by such embodiments, but rather construed according to the following claims.

What is claimed is:

1. A method for utilizing a tag to optimize portion of data transfer comprising:

providing at least one storage location on a single node for storing at least one portion of data received from at least one data stream;

accessing a header coupled with said portion of data, said header containing transcoding information about said portion of data;
generating a database entry at said node based on said transcoding information contained on said header;
generating a tag pointing to said database entry of said transcoding information contained on said header of said portion of data;
correlating said tag pointing to said database entry with said portion of data; and
transcoding the portion of data based on said transcoding information of said database pointed to by said tag without requiring access to said header or other data within said portion of data.

2. The method of claim 1 further comprising:
providing a plurality of virtual storage locations within said storage location on said single node.

3. The method of claim 1 further comprising:
providing a plurality of separate storage locations within said single node, wherein each of said plurality of separate storage locations relates to a plurality of distinct data streams.

4. The method of claim 1 comprising:
providing on said database a rate evaluation for determining the size of said portion of data, said rate evaluation extrapolated from said header.

5. The method of claim 1 comprising:
providing on said database a distortion evaluation for determining the value of the data on said portion of data, said rate evaluation extrapolated from said header.

6. The method of claim 1 wherein the processing of the portion of data comprises:
utilizing said tag to select a non-scalable portion of data for deletion.

7. The method of claim 1 wherein the processing of the portion of data comprises:
utilizing said tag to select the truncating point for truncating a scalable portion of data.

8. The method of claim 1 comprising:
utilizing a decryption algorithm to read the header information and generate the database entry.

9. The method of claim 1 further comprising:
performing said transcoding across a plurality of different media streams to fairly share the resulting distortion across all of the streams such that each of said plurality of different media streams is affected by the same amount of distortion.

10. The method of claim 1 further comprising:
performing said transcoding across a plurality of different media streams to reduce the total distortion seen across all of the streams.

11. The method of claim 1 further comprising:
performing said transcoding across a plurality of different media streams to reduce the maximum distortion that afflicts any single stream.

12. The method of claim 1 further comprising:
performing said transcoding across a plurality of different media streams when said different streams have different quality of service requirements.

13. The method of claim 1 wherein said transcoding is performed at a location selected from the group of location consisting of: a sender node, a mid-network node, and a receiving node.

14. A node for utilizing a tag when performing a processing operation comprising:
a receiver for receiving at least one packet of data from at least one data stream;
a storage element on said node for storing at least one portion of data received from at least one data stream;
a controller for accessing a header coupled with said portion of data, said header containing transcoding information about said portion of data;
a processor for generating a database entry at said node based on said transcoding information contained on said header;
a tag provider for generating a tag pointing to said database entry of said transcoding information contained on said header of said portion of data;
a correlator for correlating said tag pointing to said database entry with said portion of data; and
an editor for transcoding the portion of data based on said transcoding information of said database pointed to by said tag without requiring access to said header or other data within said portion of data.

15. The node of claim 14 further comprising:
a plurality of virtual storage locations within said storage location on said single node.

16. The node of claim 14 further comprising:
a plurality of separate storage locations within said single node, wherein each of said plurality of separate storage locations relates to a distinct data stream.

17. A non-transitory computer-usable medium having computer-readable program code stored thereon for causing a computer system to perform a method for utilizing a tag to optimize portion of data transfer comprising:
providing at least one storage location on a single node for storing at least one portion of data received from at least one data stream;
accessing a header coupled with said portion of data, said header containing transcoding information about said portion of data;
generating a database entry at said node based on said transcoding information contained on said header;
generating a tag pointing to said database entry of said transcoding information contained on said header of said portion of data;
correlating said tag pointing to said database entry with said portion of data; and
transcoding the portion of data based on said transcoding information of said database pointed to by said tag without requiring access to said header or other data within said portion of data.

18. The non-transitory computer-usable medium of claim 17 further comprising:
providing a plurality of virtual storage locations within said storage location on said single node.

19. The non-transitory computer-usable medium of claim 17 further comprising:
providing a plurality of separate storage locations within said single node, wherein each of said plurality of separate storage locations relates to a distinct data stream.

20. The non-transitory computer-usable medium of claim 17 comprising:
providing on said database a rate evaluation for determining the size of said portion of data, said rate evaluation extrapolated from said header.

* * * * *